US008652335B2

(12) United States Patent
Pears et al.

(10) Patent No.: US 8,652,335 B2
(45) Date of Patent: Feb. 18, 2014

(54) SCAVENGER SUPPORTS AND THE USE THEREOF IN A PROCESS FOR THE EXTRACTION OF METALS

(75) Inventors: David Alan Pears, Manchester (GB); Kevin Edward Treacher, Manchester (GB)

(73) Assignee: Johnson Matthey Finland OY, Turku (FI)

( * ) Notice: Subject to any disclaimer, the term of this patent is extended or adjusted under 35 U.S.C. 154(b) by 0 days.

(21) Appl. No.: 13/462,288

(22) Filed: May 2, 2012

(65) Prior Publication Data

US 2012/0211439 A1     Aug. 23, 2012

Related U.S. Application Data

(62) Division of application No. 11/597,837, filed as application No. PCT/GB2005/002308 on Jun. 13, 2005.

(30) Foreign Application Priority Data

Jun. 18, 2004  (GB) .................................. 0413630.5

(51) Int. Cl.
| | |
|---|---|
| B01J 20/10 | (2006.01) |
| B01J 20/26 | (2006.01) |
| B01D 15/38 | (2006.01) |
| B01D 15/00 | (2006.01) |

(52) U.S. Cl.
USPC ........... 210/679; 210/660; 210/681; 210/688; 210/263; 210/749; 502/402; 502/405; 502/407; 525/330.5; 525/379; 525/381; 525/382

(58) Field of Classification Search
USPC ................. 210/660, 679, 681, 688, 263, 749; 502/402, 407, 405; 525/330.5, 379, 525/381, 382

See application file for complete search history.

(56) References Cited

U.S. PATENT DOCUMENTS

| | | | |
|---|---|---|---|
| 3,335,112 A | 8/1967 | Marks | |
| 3,770,700 A | 11/1973 | Forgione | |
| 5,548,024 A | 8/1996 | Lavoie et al. | |
| 6,090,882 A * | 7/2000 | Trumbo et al. | ................ 524/555 |

FOREIGN PATENT DOCUMENTS

| | | |
|---|---|---|
| CN | 1400322 A | 3/2003 |
| EP | 0 492 847 A2 | 7/1992 |
| EP | 0 492 847 A3 | 7/1992 |
| EP | 0 634 393 A1 | 1/1995 |
| EP | 0 808 853 A2 | 11/1997 |
| WO | WO-97/08134 A1 | 3/1997 |
| WO | WO-97/45468 A1 | 12/1997 |
| WO | WO-97/45495 A1 | 12/1997 |
| WO | WO 01/98378 A1 * | 12/2001 |
| WO | WO-01/98378 A1 | 12/2001 |

OTHER PUBLICATIONS

Seshadri et al., Z. Anal. Chem. 296 (1979) 247-252.*
Balakrishnan et al., "Particle Size Control in Suspension Copolymerization of Styrene, Chloromethylstyrene, and Divinylbenzene," *Journal of Applied Polymer Science*, 1982, vol. 27, pp. 133-138.
Booth et al., "Polymer-Supported Quenching Reagents for Parallel Purification," *J. Am. Chem. Soc.*, 1997, vol. 119, pp. 4882-4886.
Caldarelli et al., "Clean five-step synthesis of an array of 1,2,3,4-tetra-substituted pyrroles using polymer-supported reagents," *J. Chem. Soc., Perkin Trans.*, 1999, vol. 1, pp. 107-110.
Creswell et al., "Combinatorial Synthesis of Dihydopyridone Libraries and their Derivatives," *Tetrahedron*, 1998, vol. 54, pp. 3983-3998.
Flynn et al., "Chemical Library Purification Strategies Based on Principles of Complementary Molecular Reactivity and Molecular Recognition," *J. Am. Chem. Soc.*, 1997, vol. 119, pp. 4874-4881.
Gayo et al., "Ion-Exchanging Resins for Solution Phase Parallel Synthesis of Chemical Libraries," *Tetrahedron Letters*, 1997, vol. 38, No. 4, pp. 513-516.
Kaldor et al, "Discovery of Antirhinoviral Leads by Screening a Combinatorial Library of Ureas Prepared Using Covalent Scavengers," *Bioorganic & Medicinal Chemistry Letters*, 1996, vol. 6, No. 24, pp. 3041-3044.
Kaldor et al., "Combinatorial chemistry using polymer-supported reagents," *Current Opinion in Chemical Biology*, 1997, vol. 1, pp. 101-106.
Kaldor et al., "Use of Solid Supported Nucleophiles and Electrophiles for the Purification of Non-Peptide Small Molecule Libraries," *Tetrahedron Letters*, 1996, vol. 37, No. 40, pp. 7193-7196.
Sherrington, "Preparation, structure and morphology of polymer supports," *Chem. Commun.*, 1998, pp. 2275-2286.
Siegel et al., "Rapid Purification of Small Molecule Libraries by Ion Exchange Chromatography," *Tetrahedron Letters*, 1997, vol. 38, No. 19, pp. 3357-3360.
Thompson et al., "Synthesis and Applications of Small Molecule Libraries," *Chem. Rev.*, 1996, vol. 96, pp. 555-600.

* cited by examiner

*Primary Examiner* — Roberto Rabago
(74) *Attorney, Agent, or Firm* — RatnerPrestia

(57) ABSTRACT

A scavenger support and a process for removing metal from solution by contacting the solution with the scavenger support, whereby the scavenger support binds to at least some of the metal in solution thereby decreasing the amount of metal in solution. The scavenger support is a functionalised support having pendant groups selected from 1,3-ketoesters or 1,3-ketoamides or mixtures thereof having a structure according to formula 1, wherein a number of the pendant groups are reacted with an amine:

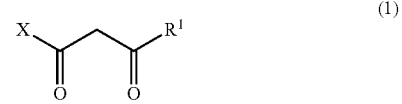

(1)

wherein $R^1$ is an optionally substituted hydrocarbyl, perhalogenated hydrocarbyl or heterocyclyl group; X is O or $NR^2$, wherein the free valence of O or $NR^2$ is bonded to a support optionally via a linker; and $R^2$ is hydrogen, an optionally substituted hydrocarbyl, or heterocyclyl group.

19 Claims, No Drawings

SCAVENGER SUPPORTS AND THE USE THEREOF IN A PROCESS FOR THE EXTRACTION OF METALS

CROSS-REFERENCE TO RELATED APPLICATIONS

This application is a divisional application of U.S. patent application Ser. No. 11/597,837, filed Sep. 22, 2008, which is the U.S. National Phase application of PCT International Application No. PCT/GB2005/002308, filed Jun. 13, 2005, and claims priority of British Patent Application No. 0413630.5, filed Jun. 18, 2004, the disclosures of all of which are incorporated herein by reference in their entireties for all purposes.

FIELD OF THE INVENTION

This invention relates to scavenger supports and to processes for the removal of metal values especially palladium from solution using scavenger supports, particularly scavenger supports obtainable by reacting ketoester resin supports with amines.

BACKGROUND OF THE INVENTION

Over the past few years, the exploration and utilization of combinatorial chemistry (and multi parallel synthesis) as a pharmaceutical drug discovery technology has rapidly evolved. The field of combinatorial/multi parallel chemistry has expanded to include not only solid and solution-phase methods for expedited compound synthesis, but also hybrid approaches which combine the purification advantages of solid-phase synthesis with the flexibility of solution-phase synthesis. (Kaldor, S. W. and Siegel, M. G., *Curr. Opin. Chem. Biol.* 1997, 1, 101-106 and Thompson, L. A. and Ellman J. A., *Chem. Rev.* 1996, 96, 555-600) Inherent in any approach to produce chemical libraries is the need to rapidly purify, isolate, and manipulate chemical library members during their preparation.

Polymeric scavenging reagents have emerged as useful tools for combinatorial synthesis, particularly, for solution-phase chemical library synthesis. These materials are employed to remove, or scavenge, unwanted reagents or bi-products and thus aid in the purification of materials. (Creswell, M. W. et. al., *Tetrahedron*, 1998, 54, 3983-3998; Kaldor, S. W. et. al., *Tetrahedron Lett.* 1996, 37, 7193-7196; Flynn, D. L. et. al., S., *J. Am. Chem. Soc.* 1997, 119, 4874-4882; Kaldor, S. W. et. al., *Bioorg. Med. Chem. Lett.* 1996, 24(6), 3041-3044; Caldarelli, M. et. al., *J. Chem. Soc., Perkin Trans.* 1. 1999, 107-110; Booth, R. J. and Hodges, J. C., *J. Am. Chem. Soc.* 1997, 119, 4882-4886; Gayo, L. M. and Suto, M. J., *Tetrahedron Lett.* 1997, 38, 513-516; and Siegel, M. G. et. al., *Tetrahedron Lett.* 1997, 38, 3357-3360). Typically, the polymeric scavengers are added after the chemical reaction is complete to remove excess reactants and bi-products. The resulting resin bound reactants are removed by simple filtration leaving the product in solution. Examples of polymeric scavenger reagents include:

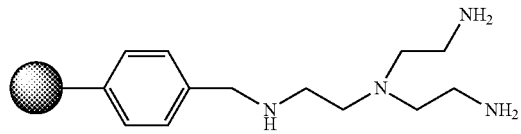

-continued

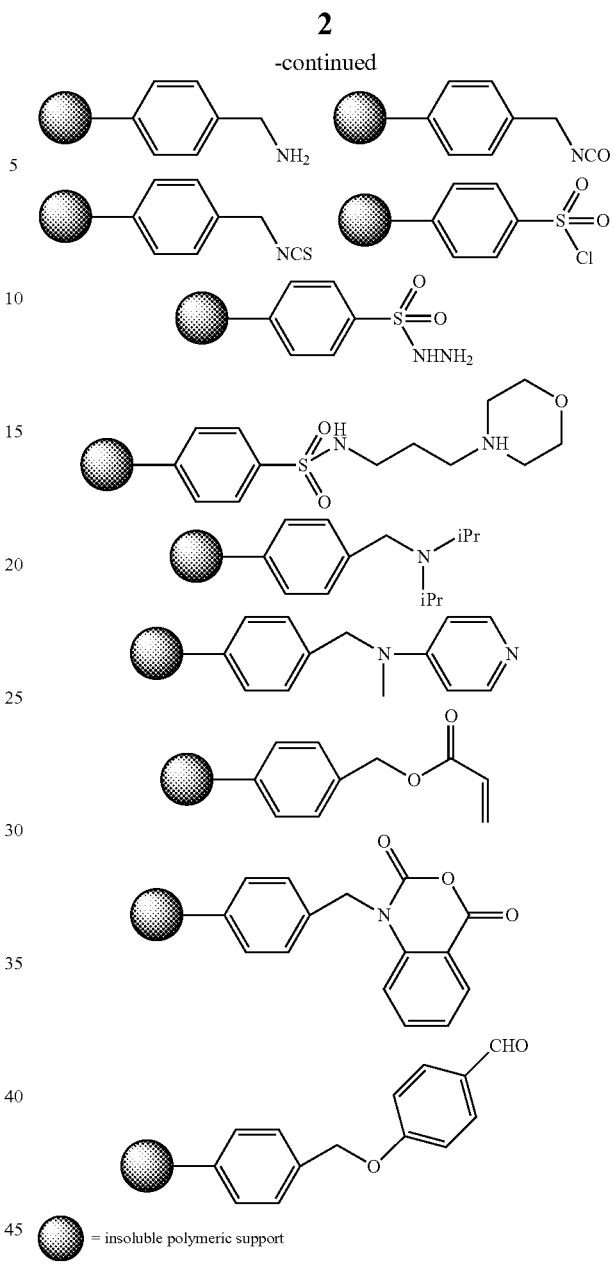

All the above resins are made by initial synthesis of a polystyrene or polystyrene copolymer bead followed by one or more chemical modification steps to introduce the scavenging functionality. For example, the isocyanate functional bead which is sold as a scavenger for amines can be prepared from the Merrified resin via the amino methyl polystyrene:

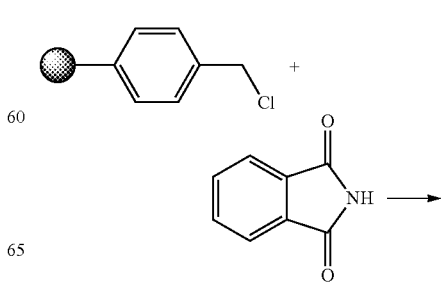

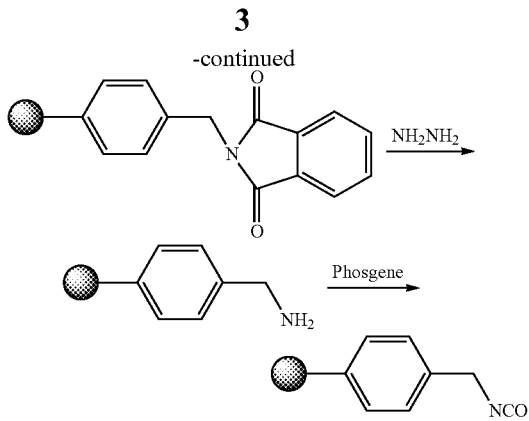

The resins used are typically lightly crosslinked polystyrenes (1 to 3% divinyl benzene) which typically require solvents that will swell the resin to allow reagents to access the polymer bound functional groups. Alternatively the resin could be a macroporous resin (high divinylbenzene content) which has permanent porosity allowing reactants to access the functional groups independent of the solvent type.

Many of the scavenger supports that are employed in combinatorial applications are designed for the removal of organic reagents. One area of synthesis where the use of scavenger supports is potentially useful is for example in metal mediated reactions. Metal mediated reactions are useful in synthesis for performing a variety of chemical transformations, however typically the catalysts employed in these reactions are transition metal derived.

Additionally the removal of catalyst residues from metal-catalysed processes at the industrial scale is becoming more important. Stricter regulations on the contamination of products and wastestreams have generated a higher need for alternative methods of removing heavy metals from these products and wastestreams. In particular in the pharmaceutical industry regulation by the Federal Drug Administration (FDA) has resulted in very low target levels of transition metals in Active Pharmceutical Ingredients (APIs). Additionally metal contamination in a pharmaceutical intermediate can interfere with chemistry carried out at a later stage in the manufacturing process.

There is therefore a need for functionalised supports which act as scavengers for metals, especially transition metals, and which show good chemical stability.

SUMMARY OF THE INVENTION

According to a first aspect of the present invention there is provided a process for removing metal from solution wherein a solution comprising a metal is contacted with a scavenger support, whereby the scavenger support binds to at least some of the metal in solution thereby decreasing the amount of metal in solution.

According to a second aspect of the present invention there is provided a scavenger support comprising a functionalised support comprising pendant groups selected from 1,3-ketoesters or 1,3-ketoamides or mixtures thereof attached to a support wherein a number of the pendant groups are reacted with an amine.

DETAILED DESCRIPTION OF THE INVENTION

In the process of the present invention, the functionalised support may first be reacted with an amine to give the scavenger support, then the scavenger support may be added to a solution comprising a metal. The scavenger support loaded with metal is then separated from the solution, preferably by filtration, the contact time being such as to allow for at least partial depletion of the metal in solution. Alternatively, a solution comprising a metal is passed through a mass or column of scavenger support, the dwell time being such as to allow for at least partial depletion of the metal in solution. Contact or dwell time can be determined by monitoring reductions in levels of metal in solution.

In the process of the present invention, the choice of amine may influence the affinity and/or selectivity of the scavenger support to bind metals.

Typically, the metal is a transition metal. Preferably, the metal is a platinum group metal (Group 8, 9 or 10), and more preferably the metal is palladium. Preferably, the metal is present in solution as a metal salt, a metal complex or a complexed metal salt. Preferred metal salts include metal salts of carboxylic acids, for example metal acetates, metal halides, metal chlorides and bromides, and metal salts of acetoacetates. Preferred complexed metal salt include metal-ligand halides wherein the ligand is one or more phosphines, for example triphenylphosphine, one or more amines, for example triethylamine, or one or more nitriles, for example acetonitrile, or mixtures thereof. Examples of metal salts, metal complexes or complexed metal salts include $Pd(OAc)_2$, Tris(dibenzylideneacetone)dipalladium(0), $PdCl_2$, $CoCl_2(PPh_3)_2$, $Ni(Acac)_2$, $NiCl_2(PPh_3)_2$, $OV(Acac)_2$, $[Rh(OAc)_2]_2$, and $Cu(Acac)_2$.

In some cases, the exact nature of the metal species is not known as it is derived from a catalyst species used during a metal catalysed reaction, which may have been changed by the reaction conditions or the processing conditions after the reaction, for example by exposure to heat, pressure, reagents, solvents, processing aids, extraction processes, filtration and other such processes typically carried out during chemical processing. In some cases, the metal species may be present as a result of contamination during processing, for example by use of inappropriate processing materials or processing conditions (such as use of hydrochloric acid in stainless steel vessels), resulting in contamination of the desired product from undesired metal residues. In general where the nature of the metal species is not known the presence of the metal is detected by the use of appropriate analytical methods, such as Inductively Coupled Plasma or Atomic Absorption Spectrometry.

The process of the present invention may be carried out in the presence of a solvent. Suitable solvents include any solvent which is compatible with the scavenger support. Suitable solvents include solvents capable of swelling scavenger supports based on crosslinked resins or solvent capable of entering the pores of scavenger supports based on macroporous resins. Suitable solvents may be selected from polar, non-polar, protic and aprotic solvents. Examples of suitable solvents include aliphatic hydrocarbons such as hexane and heptane, aromatic hydrocarbons such as toluene and xylene, chlorinated hydrocarbons such as dichloromethane (DCM), and chloroform, ethers such as diethyl ether, methyl-tert-butyl ether and tetrahydrofuran (THF), esters such as ethyl acetate and isopropyl acetate, ketones such as acetone and methyl ethyl ketone, dipolar aprotic solvents such as N,N-dimethylformamide (DMF), dimethylsulphoxide (DMSO) and N-methylpyrrolidinone (NMP), nitriles such as acetonitrile and propionitrile, alcohols such as methanol and propan-2-ol, and water and mixtures thereof. Preferred solvents include toluene, THF, DCM, DMF and propan-2-ol.

The process of the present invention may be applied to removing the metals from mixtures resulting from a chemical reaction. A chemical reaction mixture may comprise a large variety of components, including, but not being limited to, starting materials, solvents, reagents, catalysts, by-products and products. The mixture from such a chemical reaction may be contacted directly with the scavenger support of the present invention whereby the scavenger support binds to at least some of the metal in solution thereby decreasing the amount of metal in solution. The process of the present invention may be used as part of a larger process to isolate and purify the desired product from the reaction mixture. Thus, the process of the present invention may be used as a first, intermediate or last step in removing the unwanted components of the mixture, such as starting materials, solvents, reagents, catalysts and by-products. The process of the present invention may be used in combination or concurrently with other purification processes. Such purification processes are well known to a person skilled in the art. Particularly the process of the present invention may be used concurrently with other solid-phase purification methods, such as scavenging for acids, bases, nucleophiles, electrophiles or other specific components, solid phase extraction (SPE), chromatography, clarification. When used concurrently, the process of the present invention may lead to low levels of metal in the product with no extra processing steps.

The process of the present invention may be carried out at temperatures ranging from −100 to 250° C., preferably from −10 to 100° C., more preferably from 10 to 40° C. and most preferably at ambient temperature, for example from 15 to 30° C.

In the process of the present invention preferably sufficient scavenger support is employed to effect the removal of substantially all the metal. Preferably, the ratio of scavenger support to metal solution employed is directly related to the concentration of metal present and the percentage of active functionality on the scavenger support. The percentage active functionality on the scavenger support represents the percentage 1,3-ketoester and/or 1,3-ketoamide pendant groups of the functional support that have been reacted with amine. The ratio of molar concentration of active functionality on the scavenger support to molar concentration of metal in solution may be in the range from 1:1 to 100:1. Preferably an excess of active functionality is employed, for example ratios in the range of 1:1 to 20:1 or more preferably in the range of 1:1 to 4:1. Such excesses may promote effective and fast removal of the metal.

The functional supports comprising pendant 1,3-ketoester or 1,3-ketoamide groups which are reacted with amines to give the scavenger support which is employed in the process of the present invention can have the 1,3-ketoester or 1,3-ketoamide pendant groups attached directly to a support or attached to a support through a linking group. Preferably, the 1,3-ketoester or 1,3-ketoamide pendant groups are attached to a support through a linking group. Suitable linking groups include those groups as set out below in the definition of L.

The functional supports to which the pendant 1,3-ketoester or 1,3-ketoamide groups are attached include inorganic and organic supports. Preferably, the support is an organic support, more preferably an organic resin support, particularly synthetic organic resins.

The 1,3-ketoester or 1,3-ketoamide pendant groups include groups of formula 1:

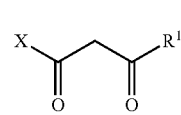

wherein
R$^1$ is an optionally substituted hydrocarbyl, perhalogenated hydrocarbyl or heterocyclyl group;
X is O or NR$^2$, wherein the free valence of O or NR$^2$ is bonded to a support optionally via a linker; and
R$^2$ is hydrogen, an optionally substituted hydrocarbyl, or heterocyclyl group.

Hydrocarbyl groups which may be represented by R$^1$ and R$^2$ include alkyl, alkenyl and aryl groups, and any combination thereof, such as aralkyl and alkaryl, for example benzyl groups.

Alkyl groups which may be represented by R$^1$ and R$^2$ include linear and branched alkyl groups comprising up to 20 carbon atoms, particularly from 1 to 7 carbon atoms and preferably from 1 to 5 carbon atoms. When the alkyl groups are branched, the groups often comprise up to 10 branched chain carbon atoms, preferably up to 4 branched chain atoms. In certain embodiments, the alkyl group may be cyclic, commonly comprising from 3 to 10 carbon atoms in the largest ring and optionally featuring one or more bridging rings. Examples of alkyl groups which may be represented by R$^1$ and R$^2$ include methyl, ethyl, propyl, 2-propyl, butyl, 2-butyl, t-butyl and cyclohexyl groups.

Alkenyl groups which may be represented by R$^1$ and R$^2$ include C$_{2-20}$, and preferably C$_{2-6}$ alkenyl groups. One or more carbon-carbon double bonds may be present. The alkenyl group may carry one or more substituents, particularly phenyl substituents. Examples of alkenyl groups include vinyl, styryl and indenyl groups.

Aryl groups which may be represented by R$^1$ and R$^2$ may contain 1 ring or 2 or more fused rings which may include cycloalkyl, aryl or heterocyclic rings. Examples of aryl groups which may be represented by R$^1$ and R$^2$ include phenyl, tolyl, fluorophenyl, chlorophenyl, bromophenyl, trifluoromethylphenyl, anisyl, naphthyl and ferrocenyl groups.

Perhalogenated hydrocarbyl groups which may be represented by R independently include perhalogenated alkyl and aryl groups, and any combination thereof, such as aralkyl and alkaryl groups. Examples of perhalogenated alkyl groups which may be represented by R include —CF$_3$ and —C$_2$F$_5$.

Heterocyclic groups which may be represented by R$^1$ and R$^2$ independently include aromatic, saturated and partially unsaturated ring systems and may constitute 1 ring or 2 or more fused rings which may include cycloalkyl, aryl or heterocyclic rings. The heterocyclic group will contain at least one heterocyclic ring, the largest of which will commonly comprise from 3 to 7 ring atoms in which at least one atom is carbon and at least one atom is any of N, O, S or P. Examples of heterocyclic groups which may be represented by R$^1$ and R$^2$ include pyridyl, pyrimidyl, pyrrolyl, thiophenyl, furanyl, indolyl, quinolyl, isoquinolyl, imidazoyl and triazoyl groups.

When any of R$^1$ or R$^2$ is a substituted hydrocarbyl or heterocyclic group, the substituent(s) should be such so as not to adversely affect the rate or selectivity of the reaction. Optional substituents include halogen, cyano, nitro, hydroxy, amino, thiol, acyl, hydrocarbyl, perhalogenated hydrocarbyl, heterocyclyl, hydrocarbyloxy, mono or dihydrocarbylamino, hydrocarbylthio, esters, carbonates, amides, sulphonyl and sulphonamido groups wherein the hydrocarbyl groups are as defined for $R^1$ and $R^2$ above. One or more substituents may be present.

$R^1$ is preferably an alkyl group, most preferably a methyl group.

$R^2$ is preferably hydrogen or an alkyl group. When $R^2$ is an alkyl group, preferably $R^2$ is a methyl group. Most preferably $R^2$ is hydrogen.

Supports include inorganic supports and organic supports, particularly polymer supports.

Inorganic supports may be derived from naturally occurring inorganic materials or matrices or may be synthesised. Inorganic materials or matrices include glasses, silicas, aluminas, titanates and hybrid oxides thereof, graphites, oxides and zeolities. Certain inorganic supports may be derived from the reaction of inorganic materials or matrices with functionalising reagents either to give an inorganic support comprising pendant 1,3-ketoester or 1,3-ketoamide groups or to give a support with suitable functionalisation, for example pendant halo, hydroxy or amino groups to which the pendant 1,3-ketoester or 1,3-ketoamide groups can be attached directly or through a linking group.

In certain embodiments, an amino functionalised silica is reacted with diketene, 2,2,6-trimethyl-4H-1,3-dioxin-4-one or esters of acetoacetic acid such as t-butyl acetoacetate (in an ester-amide exchange reaction) to form a silica support with pendant 1,3-ketoamide groups.

In further embodiments, an amino functionalised silica is reacted with a multifunctional ketoester or ketoamide, examples of which include ethylene glycol diacetoacetate, ethylene bisacetoacetamide, 1,1,1-tris(acetoacetoxymethyl) propane, diacetoacet-o-tolidide, diacetoacet-1,4-phenylenediamide, diacetoacet-2,5-dimethyl-1,4-phenylenediamide, diacetoacet-2-chloro-5-methyl-1,4-phenylenediamide and diacetoacet-2,5-dichloro1,4-phenylenediamide, resulting in the silica being attached to pendant ketoester or ketoamide groups via a ketoamide linkage, as shown below.

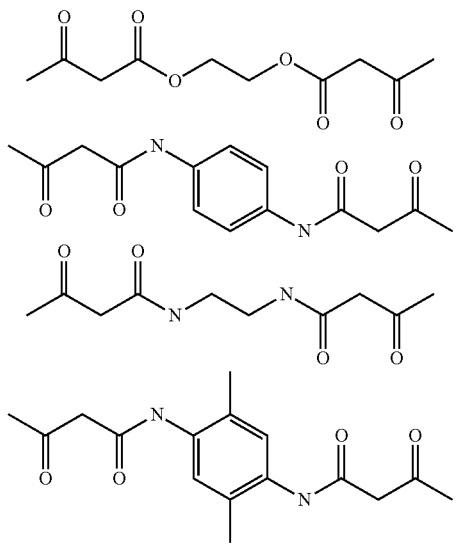

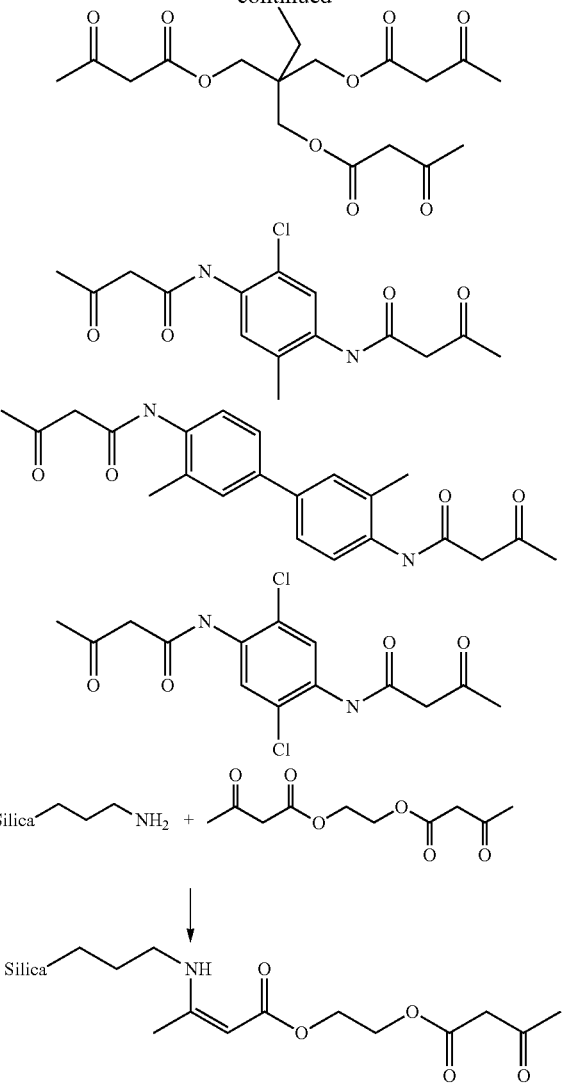

Alternatively, silica supports with pendant 1,3-ketoester groups can be obtained by the above methods by using a hydroxy functionalised silica, for example by reacting a hydroxy functionalised silica with diketene, 2,2,6-trimethyl-4H-1,3-dioxin-4-one or esters of acetoacetic acid such as t-butyl acetoacetate (in a transesterification reaction) to form a silica support with pendant 1,3-ketoester groups.

Polymer support may be derived from the polymerisation of a composition comprising one or more monomers, and is preferably derived from the polymerisation a composition comprising of two or more monomers. The monomers may contain one or more polymerisable double bonds. Preferably the polymer support is derived from the polymerisation of a composition comprising one or more monomers containing only one polymerisable double bond, and one or more monomers containing two or more polymerisable double bonds. Most preferably the polymer support is derived from the polymerisation of a composition comprising one or two monomers containing only one polymerisable double bond, and one monomer containing two or three polymerisable double bonds.

Examples of monomers containing only one polymerisable double bond include styrene and substituted styrenes such as α-methyl styrene, methyl styrene, t-butyl styrene, bromo styrene and acetoxy styrene; alkyl esters of mono-olefinically unsaturated dicarboxylic acids such as di-n-butyl maleate and di-n-butyl fumarate; vinyl esters of carboxylic acids such as vinyl acetate, vinyl propionate, vinyl laurate and vinyl esters of versatic acid such as VeoVa 9 and VeoVa 10 (VeoVa is a trademark of Shell); acrylamides such as methyl acrylamide and ethyl acrylamide; methacrylamides such as methyl methacrylamide and ethyl methacrylamide; nitrile monomers such as acrylonitrile and methacrylonitrile; and esters of acrylic and methacrylic acid, preferably optionally substituted $C_{1-20}$alkyl and $C_{1-20}$cycloalky esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate. Functional derivatives of the foregoing monomers containing only one polymerisable double bond can also be employed.

Examples of monomers containing two or more polymerisable double bonds include divinylbenzene (DVB), trivinylbenzene, and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

In certain embodiments, polymer supports are derived from the polymerisation of monomers selected from styrene and substituted styrenes, divinylbenzene, esters of acrylic, esters of methacrylic acid, alkyl esters of mono-olefinically unsaturated dicarboxylic acids, vinyl esters of carboxylic acids, acrylamides, methacrylamides and functional derivatives thereof. Preferred polymer supports are derived form the polymerisation of monomers selected from styrene and substituted styrenes, divinylbenzene, esters of acrylic acid and esters of methacrylic acid. Particularly preferred polymer supports are derived from the polymerisation of a mixture of styrene monomers, divinylbenzene monomers and methacrylate ester monomers, or are derived from the polymerisation of a mixture of styrene monomers, divinylbenzene monomers and acrylate ester monomers.

When polymer supports are derived from the polymerisation of compositions comprising monomers containing two or more polymerisable double bonds, the polymer support can exhibit varying degrees of crosslinking. The extent of crosslinking in these polymers can be expressed in percentage terms and corresponds to the number of moles of polymerisable double bonds derived from monomers containing two or more polymerisable double bonds as a percentage of the total number of moles of polymerisable double bonds.

Where the polymer support of the functional support exhibits only low levels of crosslinking, such as from 1% to 5%, or commonly from 1% to 3%, these crosslinked scavenger supports are routinely contacted with solvents which cause the scavenger support to swell. Such functional supports are frequently referred to as microporous resins.

In many embodiments, the microporous resin is swelled in the solvent of choice to allow ready access to the functional groups on the resin. Solvents of choice can be predicted by considering the polymer composition and are often those solvents which would be "good solvents" for a theoretical linear polymer which may be made from a similar composition but with no crosslinking agent present.

Preferred swell ratios for a microporous resin fall in the range of 3 to 20, more preferably 5 to 20. The swell ratio is defined as:

$$\text{Swell Ratio} = \frac{Vol_{final} - Vol_{initial}}{Vol_{initial}}$$

$Vol_{final}$=Final volume occupied by resin after allowing the resin to fully swell in a given solvent.

$Vol_{initial}$=Initial dry bed volume of resin.

Where the polymer support of the functional support exhibits higher levels of crosslinking, such as from 20% to 90%, or commonly from 30% to 80%, these highly crosslinked functional supports often have permanent porosity thus access of reagents to the pendant groups attached to the polymer support is mainly independent of solvents. Such functional supports are frequently referred to as macroporous resins.

The term macroporous indicates a class of resins which have a permanent well developed porous structure. Importantly, these resins can have much higher surface areas (as measured by nitrogen BET) in the dry state than gel type resins. Typically, surface areas in the dry state can range from 50 to 1000 m²/g. Although there is no universally accepted definition of a macroporous resin, in the case of styrene-DVB resins it has been suggested that a macroporous resin may be defined as resin which in the dry state when exposed to cyclohexane exhibits a cyclohexane uptake of at least 0.1 $m^2g^{-1}$ over 16 h (Millar, J. R. et. al., *J. Chem. Soc.*, 1996, 218.).

Macroporous resins are often formed when the composition comprising monomers containing two or more polymerisable double bonds is polymerised in the presence of a porogen. The porogen causes phase separation of the polymer matrix. Removal of the porogen and drying yields rigid, opaque, permanently porous beads. Phase separation is controlled by the nature and level of the porogen employed, and the level of crosslinking agent employed.

The selection of monomers and/or crosslinking agents from which the functional support is derived may in part be dictated by the desired morphology of the scavenger support, and the solvent or reaction systems in which the scavenger supports will be employed. The relationships between morphology and monomer compositions are reviewed in Sherrington, D. C., *J. Chem. Soc., Chem Commun.*, 1998, 2275, of which the teaching of pages 2278 to 2284 are incorporated herein by reference.

Where the pendant 1,3-ketoester or 1,3-ketoamide groups are attached either directly or by means of a linker to the polymer support, the attachment is made to the repeat units of the polymer support. Where the polymer support is derived from more than one monomer type, there will be more than one type of repeat unit. Preferably the 1,3-ketoester or 1,3-ketoamide groups are attached either directly or by means of a linker to only one type of repeat unit. Preferably the repeat unit to which the 1,3-ketoester or 1,3-ketoamide groups are attached either directly or by means of a linker is derived from a single monomer type which is a methacrylate or acrylate derived monomer.

The pendant 1,3-ketoester or 1,3-ketoamide groups which are attached either directly or by means of a linker to the polymer support may be introduced by reaction of a pre-formed polymer support with functionalising reagents, or may be introduced during the polymerisation of the polymer support.

In certain embodiments, an amino functionalised polymer, such as an amino polystyrene, is reacted with diketene, 2,2,6-trimethyl-4H-1,3-dioxin-4-one or esters of acetoacetic acid such as t-butyl acetoacetate (in an ester-amide exchange reaction) to form a polystyrene support with pendant 1,3-ketoamide groups.

In further embodiments, an amino functionalised polymer, such as an amino polystyrene, is reacted with a multifunctional ketoester or ketoamide, examples of which include ethylene glycol diacetoacetate, ethylene bisacetoacetamide, 1,1,1-tris(acetoacetoxymethyl)propane, diacetoacet-o-tolidide, diacetoacet-1,4-phenylenediamide, diacetoacet-2,5-dimethyl-1,4-phenylenediamide, diacetoacet-2-chloro-5-methyl-1,4-phenylenediamide and diacetoacet-2,5-dichloro1,4-phenylenediamide, resulting in the polymer being attached to pendant ketoester or ketoamide groups via a ketoamide linkage, as shown below.

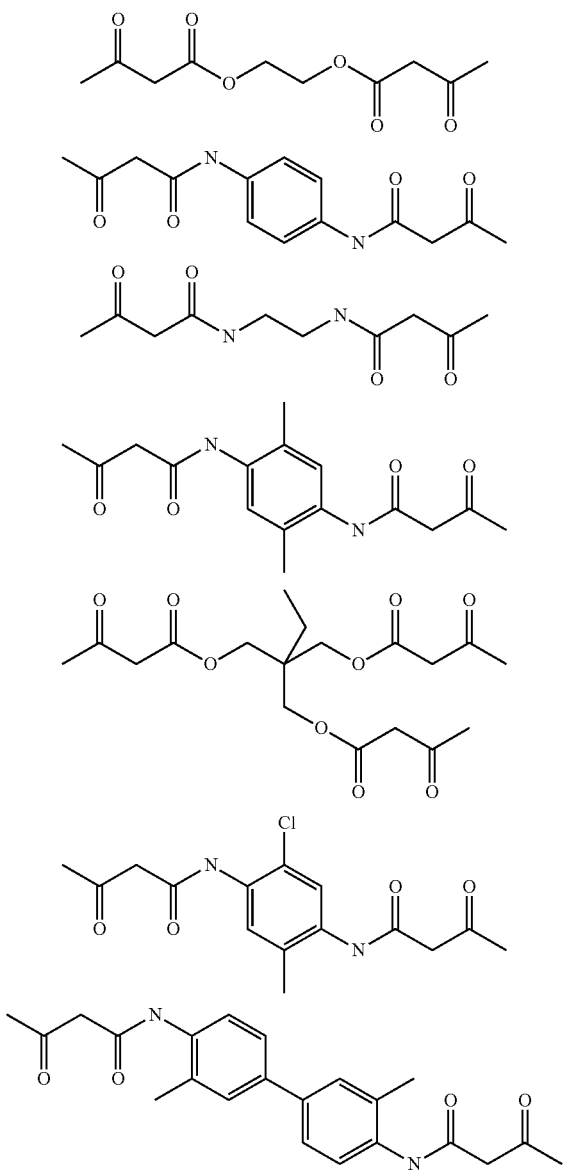

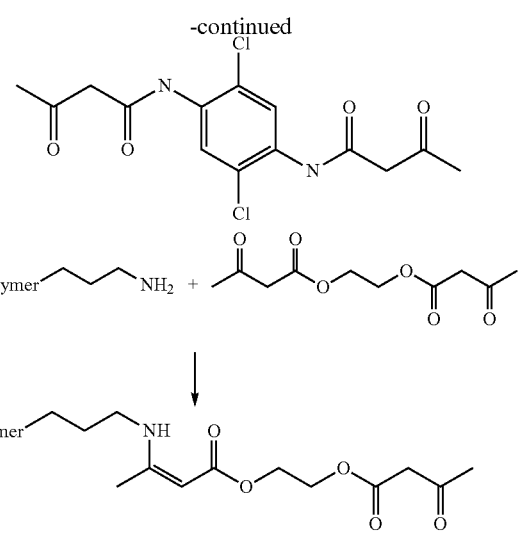

Alternatively, polymer supports with pendant 1,3-ketoester groups can be obtained by the above methods by using a hydroxy functionalised polymer, for example by reacting a hydroxy functionalised polystyrene with diketene, 2,2,6-trimethyl-4H-1,3-dioxin-4-one or esters of acetoacetic acid such as t-butyl acetoacetate (in a transesterification reaction) to form a polystyrene support with pendant 1,3-ketoester groups.

Preferably, where the pendant 1,3-ketoester or 1,3-ketoamide group are attached by means of a linker to the polymer support, the functional support is derived from the polymerisation of a composition comprising a functionalised monomer comprising pendant 1,3-ketoester or 1,3-ketoamide groups attached by means of a linker to a single monomer type. More preferably, the functional support is derived from the polymerisation of a composition comprising two or more monomers, wherein at least one monomer is a functionalised monomer comprising pendant 1,3-ketoester or 1,3-ketoamide groups attached by means of a linker to a single monomer type. Most preferably the functional support is derived from the polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type. Polymer supports derived from the polymerisation of a composition comprising one or two monomers containing only one polymerisable double bond, one monomer containing two or three polymerisable double bonds and a functionalised monomer comprising pendant 1,3-ketoester or 1,3-ketoamide groups attached by means of a linker to a single monomer type are highly preferred.

Functional supports may be derived from the polymerisation of compositions comprising a functionalised monomer comprising pendant 1,3-ketoester or 1,3-ketoamide groups attached by means of a linker to a single monomer type, and one or more monomers selected from the group comprising styrene and substituted styrenes, such as α-methyl styrene, methyl styrene, t-butyl styrene, bromo styrene and acetoxy styrene; alkyl esters of mono-olefinically unsaturated dicarboxylic acids, such as di-n-butyl maleate and di-n-butyl fumarate; vinyl esters of carboxylic acids such as vinyl acetate, vinyl propionate, vinyl laurate and vinyl esters of versatic acid such as VeoVa 9 and VeoVa 10 (VeoVa is a trademark of Shell); acrylamides such as methyl acrylamide and ethyl acrylamide; methacrylamides such as methyl methacrylamide and ethyl methacrylamide; nitrile monomers such as acrylonitrile and methacrylonitrile; esters of acrylic and methacrylic acid, preferably optionally substituted $C_{1-20}$alkyl and $C_{1-20}$cycloalkyl esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate; divinylbenzene; trivinylbenzene; and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bisacryloyl ethylene diamine. The single monomer type to which the pendant 1,3-ketoester or 1,3-ketoamide groups are attached by means of a linker is preferably a methacrylate or acrylate derived monomer unit.

Preferably the functionalised monomer comprising pendant 1,3-ketoester or 1,3-ketoamide groups has the general formula 2:

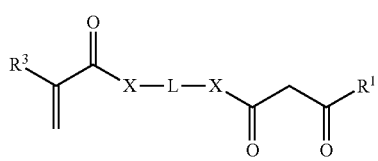

(2)

wherein
each X independently is O or $NR^2$;
$R^1$ and $R^2$ are as defined herein before above;
$R^3$ is H or an optionally substituted hydrocarbyl, perhalogenated hydrocarbyl or heterocyclyl group; and
L is a linking group.

Optionally substituted hydrocarbyl, perhalogenated hydrocarbyl or heterocyclyl groups which may be represented by $R^3$ are as defined for $R^1$ above.

More preferably the functionalised monomer comprising pendant 1,3-ketoester or 1,3-ketoamide groups has the general formula 2a:

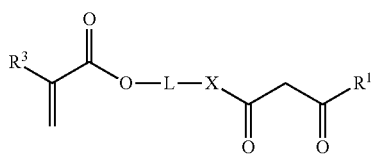

(2a)

wherein
X is O or $NR^2$;
$R^1$ and $R^2$ are as defined herein before above;
$R^3$ is H or an optionally substituted hydrocarbyl, perhalogenated hydrocarbyl or heterocyclyl group; and
L is a linking group.

Linking groups which may be represented by L include optionally substituted methylene, polymethylene, ether, polyether or cyclic bridging units.

Methylene and polymethylene bridging units which may be represented by L include linear and branched alkylene chains comprising up to 20 carbon atoms, particularly from 1 to 7 carbon atoms and preferably from 1 to 5 carbon atoms. When the alkyl groups are branched, the groups often comprise up to 10 branched chain carbon atoms, preferably up to 4 branched chain atoms. Examples of alkylene chains which may be represented by L include —$CH_2$—, —$CH_2CH_2$—, —$(CH_2)_3$—, —$CH_2CH(CH_3)$—, and —$CH_2C(CH_3)_2$— chains.

Ether and polyether bridging units which may be represented by L include linear and branched alkylene-oxy-alkylene chains or poly(alkyleneoxy)-alkylene chains comprising up to 150 carbon atoms and up to 40 oxygen atoms, particularly from 2 to 15 carbon atoms and from 1 to 4 oxygen atoms, and preferably from 2 to 6 carbon atoms and from 1 to 2 oxygen atoms. Examples of alkylene-oxy-alkylene chains or poly(alkyleneoxy)-alkylene chains which may be represented by L include —$CH_2$—O—$CH_2$—, —$CH_2CH_2$—O—$CH_2CH_2$—, —$(CH_2)_3$—O—$(CH_2)_3$—, —$CH_2CH(CH_3)$—O—$CH_2CH_2$—, —$CH_2CH(CH_3)$—O—$CH_2CH(CH_3)$— chains, and also —$[CH_2CH_2$—O$]_n$—$CH_2CH_2$— and —$[CH_2CH(CH_3)$—O$]_n$—$CH_2CH(CH_3)$— chains where n=2, 3 or 4.

Cyclic bridging units which may be represented by L include aromatic, saturated and partially unsaturated ring systems and may constitute 1 ring or 2 or more fused rings which may include cycloalkyl, aryl or heterocyclic rings. In certain embodiments, cycloalkyl and aryl rings commonly comprise from 3 to 10 carbon atoms in the largest ring, and heterocyclic rings commonly comprise from 3 to 7 ring atoms in which at least one atom is carbon and at least one atom is any of N, O, S or P. Examples of aromatic, saturated and partially unsaturated ring systems which may be represented by L include —$CH_2C_6H_4CH_2$— and —$CH_2C_6H_{10}CH_2$—.

Examples of functionalised monomers comprising pendant 1,3-ketoester or 1,3-ketoamide groups include:

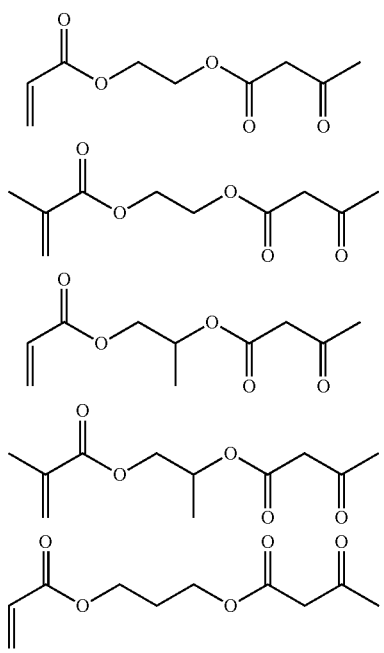

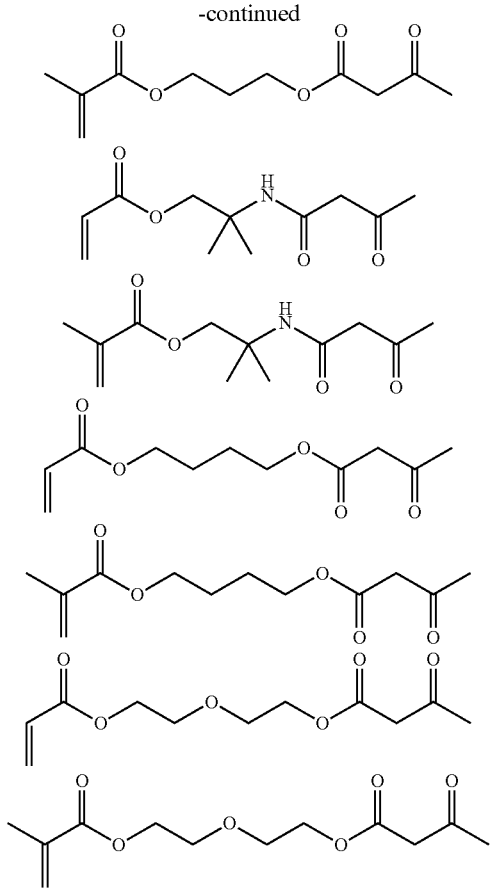

In certain highly preferred embodiments, the functionalised monomer comprising pendant 1,3-ketoester or 1,3-ketoamide groups attached by means of a linker to a single monomer type is acetoacetoxyethyl methacrylate having the formula:

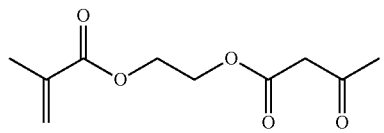

In a preferred embodiment, functional supports are derived from the polymerisation of compositions comprising a functionalised monomer comprising pendant 1,3-ketoester or 1,3-ketoamide groups selected from the group consisting of monomers having the formulae:

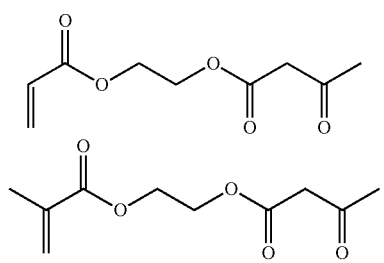

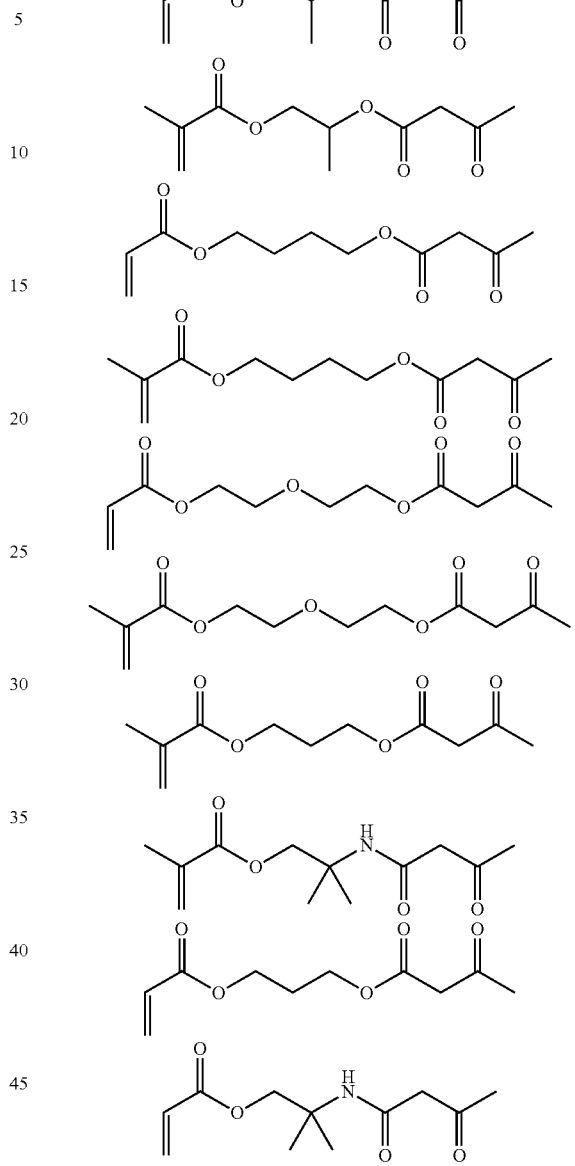

and one or more monomers selected from the group consisting of styrene and substituted styrenes, such as α-methyl styrene, methyl styrene, t-butyl styrene, bromo styrene and acetoxy styrene; alkyl esters of mono-olefinically unsaturated dicarboxylic acids, such as di-n-butyl maleate and di-n-butyl fumarate; vinyl esters of carboxylic acids, such as vinyl acetate, vinyl propionate, vinyl laurate, and vinyl esters of versatic acid such as VeoVa 9 and VeoVa 10 (VeoVa is a trademark of Shell); acrylamides, such as methyl acrylamide and ethyl acrylamide; methacrylamides, such as methyl methacrylamide and ethyl methacrylamide; nitrile monomers, such as acrylonitrile and methacrylonitrile; esters of acrylic and methacrylic acid, preferably optionally substituted $C_{1-20}$alkyl and $C_{1-20}$cycloalky esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate, and N,N-dimethylaminoethyl methacrylate; divinylbenzene; trivinylbenzene; and multifunctional acrylates and methacrylates, such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

In a more preferred embodiment, functional supports are derived from the polymerisation of compositions comprising one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate, and N,N-bis-acryloyl ethylene diamine.

In a highly preferred embodiment, functional supports are derived from the polymerisation of compositions comprising acetoacetoxyethyl methacrylate, styrene, and divinylbenzene.

Where the functional support is derived from the polymerisation of a composition comprising one or two monomers containing only one polymerisable double bonds, one monomer containing two or three polymerisable double bonds, and a functionalised monomer of general formula (2), the mole ratio of the total number of moles of monomers containing only one polymerisable double bonds to functionalised monomer of general formula (2) may be from 100:1 to 1:100, is preferably from 70:30 to 1:99, and most preferably is from 60:40 to 15:85. The level of crosslinking, as defined herein above, may be from 0.5% to 80%, preferably from 1% to 60%, and most preferably from 1% to 40%.

When the functional support is derived from the polymerisation of styrene, divinylbenzene and a functionalised monomer of general formula (2), the mole ratio of styrene to functionalised monomer of general formula (2) is often from 100:1 to 1:100, is preferably from 70:30 to 1:99, and most preferably is from 60:40 to 15:85. The level of crosslinking is often from 0.5% to 80%, preferably from 1% to 60%, and most preferably from 1% to 40%.

Functional supports prepared from functionalised monomers comprising pendant 1,3-ketoester or 1,3-ketoamide groups are preferably produced as beads. The beads often range in size from diameters of 10 μm to 2000 μm, preferably from 50 μm to 1000 μm, and most preferably from 75 μm to 500 μm.

The functional supports may be prepared by an aqueous suspension polymerisation process, for example as described in Journal of Applied Polymer Science, 1982, 27, 133-138. The monomers can be suspended as droplets often of diameter from 1 μm to 1000 μm in water. Preferably stabilisers are added to prevent agglomeration of the droplets. Examples of stabilisers which may be added include polyvinyl alcohol, polyacrylic acid, polyvinyl pyrrolidone, polyalkylene oxide, barium sulphate, magnesium sulphate, and sodium sulphate. Agitation of the suspension is preferably employed. The method of agitation employed may help to assist in maintaining the suspension. A free radical initiator commonly serves to initiate polymerisation. The free radical initiator employed is selected according to the types of monomers present. Examples of free radical initiators which may be used to prepare scavenger supports which may be employed in processes of the present invention include benzoyl peroxide, dioctanoyl peroxide, dilauroyl peroxide, 2,2'-azobisisobutyronitrile and 2,2'-azobis(2,4-dimethylvaleronitrile). The selection of a suitable temperature range may be influenced by the nature of the monomers and the initiator present. Polymerisation of the monomers is commonly carried out at temperatures ranging from 15 to 160° C., preferably from 50 to 90° C. The resultant functional support may be isolated by filtration, optionally washed with one or more solvents. Suitable solvents for washing the scavenger support include tetrahydrofuran, methanol, and water. The resultant functional support may be dried and the beads classified according to size by for example sieving.

Amines that may be reacted with the pendent 1,3-ketoester or 1,3-ketoamide pendant groups of the functional support include optionally substituted primary and secondary amines, optionally substituted hydrazines or salts thereof. The optionally substituted primary and secondary amine may include mono-amines, di-amine and polyamines. The optionally substituted primary and secondary amine, preferably is an amine of formula $HNR^4R^5$ or a hydrazine of formula $H_2NNR^4R^5$, wherein $R^4$ is a substituent group and $R^5$ is hydrogen or a substituent group, or $R^4$ and $R^5$ may optionally be linked in such a way so as to form an optionally substituted heterocyclic ring. Substituent groups which may be represented by $R^4$ and $R^5$ independently include optionally substituted hydrocarbyl groups and optionally substituted heterocyclyl groups as defined for $R^1$; sulphonyl groups, such as $SO_2R^a$, where $R^a$ is an optionally substituted hydrocarbyl group or an optionally substituted heterocyclyl group as defined for $R^1$; acyl groups, such as $COR^b$, $CO_2H$, or $CO_2R^b$ groups, where $R^b$ is an optionally substituted hydrocarbyl group or an optionally substituted heterocyclyl group as defined for $R^1$; and thioacyl groups such $CSR^c$, $CS_2H$, $CSNH_2$, $CS_2R^c$ or $CSNHR^c$ groups where Rc is an optionally substituted hydrocarbyl group or an optionally substituted heterocyclyl group as defined for $R^1$. When $R^4$ or $R^5$ is an optionally substituted hydrocarbyl groups and optionally substituted heterocyclyl groups, the optional substituents include optional substituents defined for $R^1$ and sulphonyl groups such as $SO_2R^a$, where $R^a$ is an optionally substituted hydrocarbyl group or an optionally substituted heterocyclyl group as defined for $R^1$; acyl groups, such as $COR^b$, $CO_2H$, or $CO_2R^b$ groups, where $R^b$ is an optionally substituted hydrocarbyl group or an optionally substituted heterocyclyl group as defined for $R^1$; and thioacyl groups, such as $CSR^c$, $CS_2H$, $CSNH_2$, $CS_2R^c$ or $CSNHR^c$ groups, where $R^c$ is an optionally substituted hydrocarbyl group or an optionally substituted heterocyclyl group as defined for $R^1$, and particularly where the sulphonyl, acyl, or thioacyl groups substitute amino groups of amino substituted hydrocarbyl groups. Preferably, $R^4$ is an optionally substituted hydrocarbyl group or an optionally substituted heterocyclyl group.

Examples of amines include:

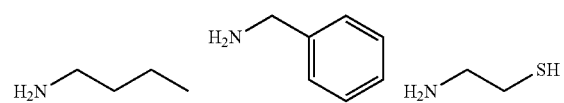

-continued

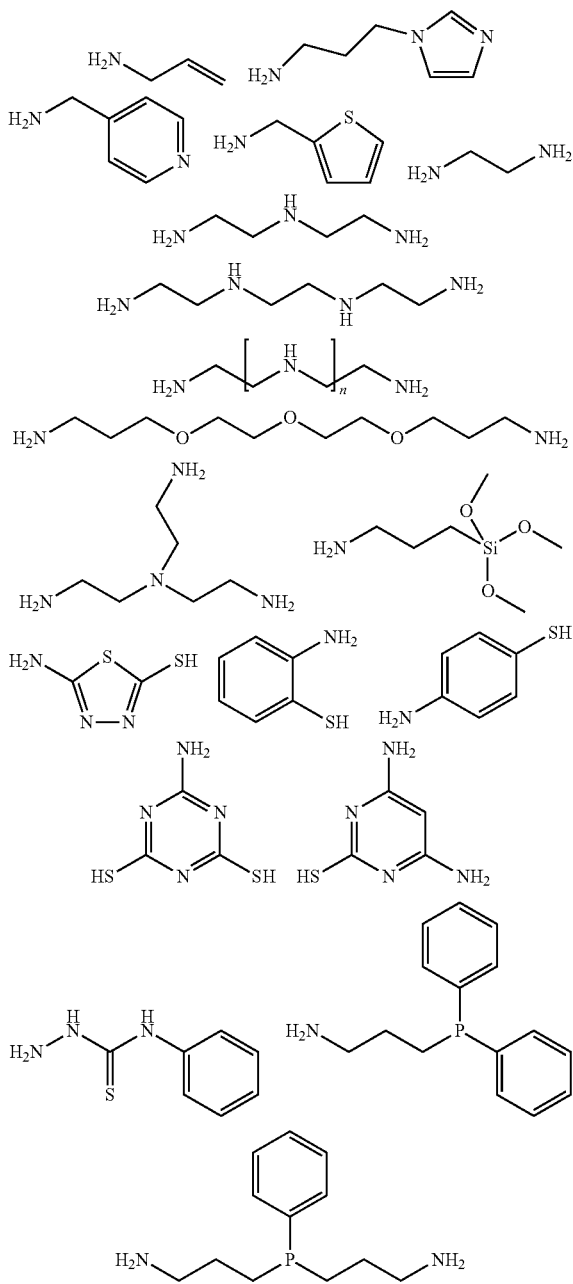

Highly preferred amines are:

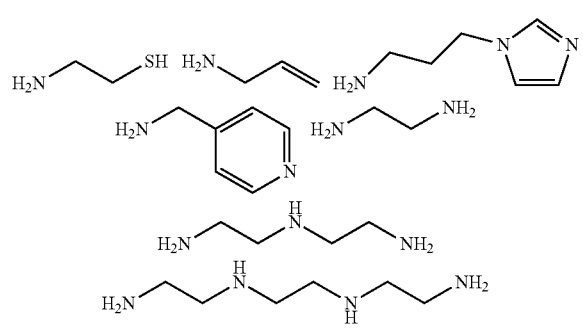

-continued

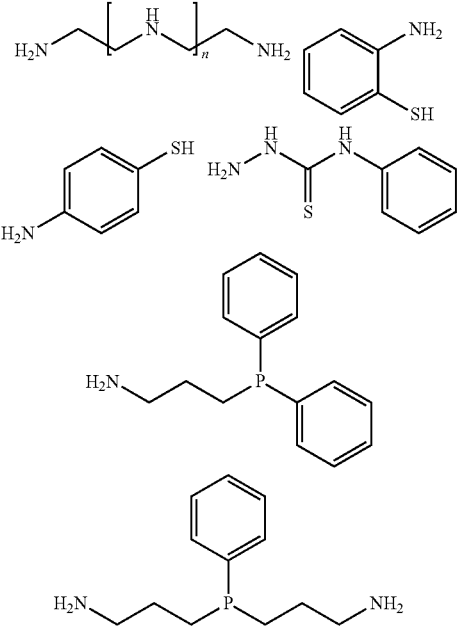

The scavenger support obtainable by the reaction of a functionalised support comprising pendant groups selected from 1,3-ketoesters or 1,3-ketoamides or mixtures thereof attached to a polymer support with an amine is preferably a scavenger support comprising pendant groups selected from 3-iminoesters, 3-iminoamides, 2,3-enaminoesters, 2,3-enaminoamides, or mixtures thereof attached to a polymer support.

The 3-iminoesters, 3-iminoamides, 2,3-enaminoesters, or 2,3-enaminoamides pendant groups includes groups of Formula (3) or (4):

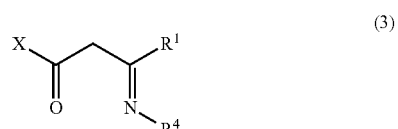 (3)

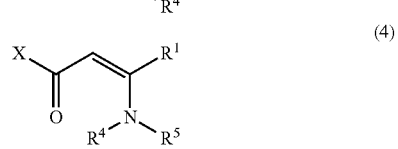 (4)

wherein
$R^1$ is an optionally substituted hydrocarbyl, perhalogenated hydrocarbyl, or heterocyclyl group;
X is O or $NR^2$, wherein the free valence of O or $NR^2$ is bonded to a polymer support optionally via a linker;
$R^2$ is hydrogen, an optionally substituted hydrocarbyl, or heterocyclyl group;
$R^4$ is a substituent group; and
$R^5$ is hydrogen or a substituent group, or $R^4$ and $R^5$ may optionally be linked in such a way so as to form an optionally substituted heterocyclic ring,
or tautomers or salts thereof.

The scavenger support used in the process of the present invention may be prepared by reacting the amine with the functional support comprising ketoester or ketoamide groups before or after contact with the metal containing solution. In the case that the amine is reacted with the functional support after contact with the metal containing solution, the solution containing the metal may be contacted first with the amine or a solution containing the amine and then brought into contact with the functional support, or the solution containing the metal may be contacted first with the functional support and then brought into contact with the amine or a solution containing the amine. Preferably the amine is reacted with the functional support to give a scavenger support containing groups according to Formula (3) or (4) before contact with the metal containing solution.

The scavenger support used in the process of the present invention may be prepared by contacting the amine with the functional support at a temperature between −100 to 250° C., preferably from −10 to 100° C., more preferably from 10 to 80° C., and most preferably at 15 to 70° C.

The scavenger support used in the process of the present invention may be prepared by contacting the amine with the functional support in the presence of a solvent. Suitable solvents include any solvent which is compatible with the functional support. Suitable solvents include any solvents that when the functional support is based on a crosslinked resin are capable of swelling the crosslinked resin or any solvents that when the functional support is based on a macroporous resins are capable of entering the pores of the macroporous resin. Suitable solvents may be selected from polar, non-polar, protic, and aprotic solvents. Examples of suitable solvents include aliphatic hydrocarbons, such as hexane and heptane; aromatic hydrocarbons, such as toluene and xylene; chlorinated hydrocarbons, such as dichloromethane (DCM) and chloroform; ethers such as diethyl ether, methyl-tert-butyl ether, and tetrahydrofuran (THF); esters, such as ethyl acetate and isopropyl acetate; ketones, such as acetone and methyl ethyl ketone; dipolar aprotic solvents, such as N,N-dimethylformamide (DMF), dimethylsulphoxide (DMSO), and N-methylpyrrolidinone (NMP); nitriles, such as acetonitrile and propionitrile; alcohols, such as methanol and propan-2-ol; water; and mixtures thereof. Preferred solvents include hexane, toluene, THF, DCM, chloroform, DMF, NMP, pyridine, acetone, ethyl acetate, methyl tertiary butyl ether, ethanol, water, and mixtures thereof. In the case of functionalised supports based on microporous resins a suitable solvent capable of swelling the resin may be used. Preferred solvents for swellable resins include toluene, THF, DCM, chloroform, DMF, NMP, pyridine, acetone, ethyl acetate, ethanol, and mixtures thereof. Where functional supports based on macroporous resin are employed, a solvent may not be required and undiluted amine may be contacted with the functional support.

The scavenger support used in the process of the present invention may be prepared by contacting the amine with the functional support optionally in the presence of a catalyst. Catalysts include catalysts which are known to promote the reaction of a ketoester or ketoamide with an amine such as silica, dehydrating agents, acids and metal salts. Preferably the catalyst is an acid, such as acetic acid, methanesulphonic acid, benzenesulphonic acid, p-toluenesulphonic acid, hydrochloric acid, or sulphuric acid, or a metal salt such as magnesium sulphate, lithium perchlorate, or zinc perchlorate.

The scavenger support used in the process of the present invention may be prepared by contacting the amine with the functional support for a time sufficient to react at least a portion of the ketoester or ketoamide groups with the amine. The ratio of molar concentration of ketoester or ketoamide functionality on the scavenger support to molar concentration of amine may be in the range from 1:100 to 100:1. Preferably an excess of amine is employed, for example ratios in the range of 1:1 to 20:1 or more preferably in the range of 1:1 to 4:1.

In a further preferred aspect of the present invention, the scavenger support prepared by reacting an amine with a functional support, as represented by formula (3) or (4), may be further chemically modified before use.

Chemical modifications may be performed with any compound capable of reacting with an amine including carboxylic acids, carboxylic acid anhydrides, carboxylic esters and thioesters, acyl halides, sulphonyl halides (to sulphonamides), epoxides, haloalkyl compounds, including haloalkylcarboxylates (alkylation of the amine), sulphonyl esters (alkylation of the amine), carbon disulphide, ketones, aldehydes, isocyanantes and isothiocyanates. One or more chemical modifications may be performed.

Preferably the scavenger support which is chemically modified before use is a scavenger support obtainable by reacting a functionalised support with an amine containing more than one amine group. Scavenger supports obtainable in this manner are scavenger supports comprising multi-amine functionality wherein at least a portion of the amine functionality comprises amine groups which are susceptible to further chemical modification. Preferably, the scavenger support comprising multi-amine functionality comprises a mixture of primary and secondary amine functionality. The chemical modification of the amine groups of the scavenger support with multi-amine functionality may be partial or complete.

In certain preferred embodiments, a functional support comprising ketoester or ketoamide groups is reacted with a tri-amine, such as diethylene tri-amine, then contacted with a reagent which will further react with amines which are present, such as carbon disulphide, an isothiocyanate, or a haloacetate, for example chloroacetic acid or salts, esters or acid chlorides thereof. Preferably, an excess of tri-amine is used to encourage reaction of a single tri-amine with a single pendant ketoester or ketoamide, therefore reducing the number of possible chains tethered at both ends.

It is postulated that when the scavenger support with multi-amine functionality is contacted with a reagent which will further react with an amine, that contacting with carbon disulphide results in the formation of dithiocarbamate groups or salts thereof, that contacting with an isothiocyanate, results in formation of thiourea groups or salts thereof, or that contacting with chloroacetic acid or salts, esters or acid chlorides thereof results in the formation of aminoacetate groups or salts thereof.

In another preferred embodiment an alkene functional amine is reacted with the ketoester or ketoamide support and then further functionalised with a difunctional phosphine.

Examples of scavenger supports which are chemically modified before use include:

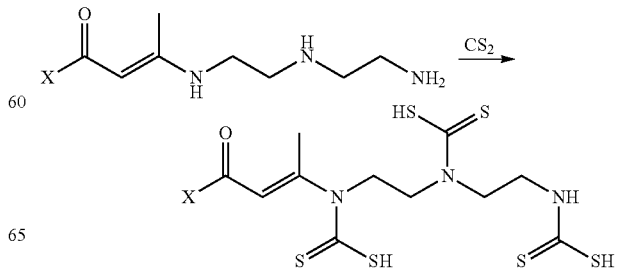

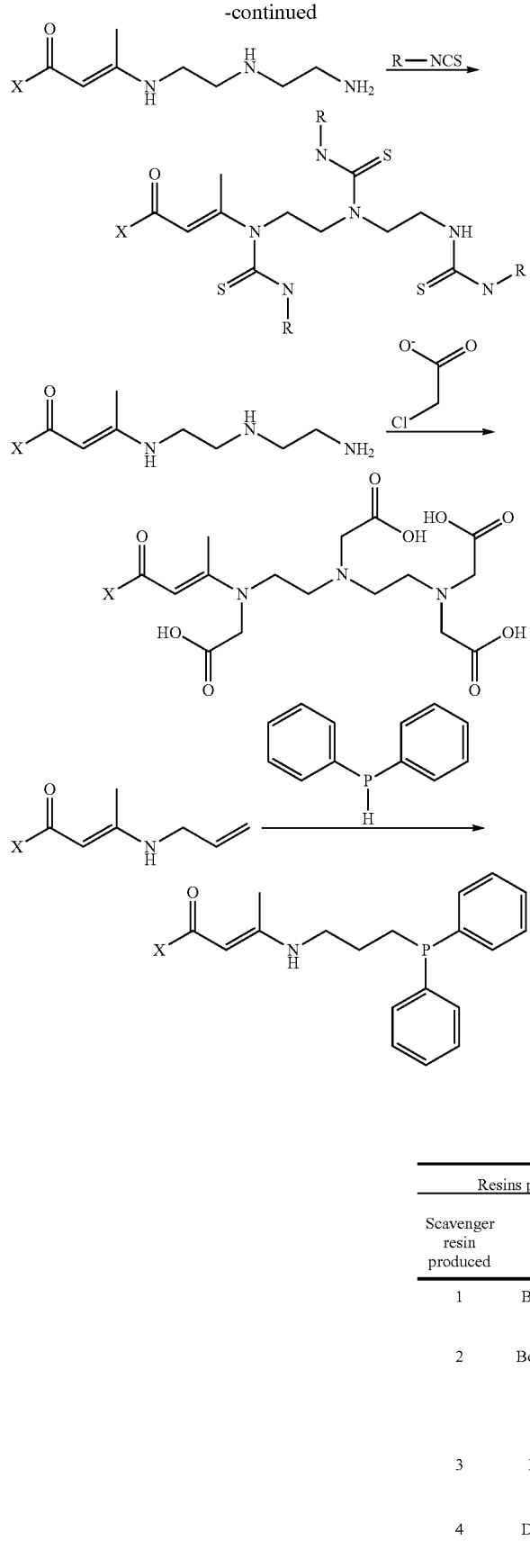

wherein R is an optionally substituted hydrocarbyl and X is a support as described herein before.

When the scavenger supports described herein before are used to bind metals, for example in the process according to the first aspect of the present invention, the resulting support bound metal compositions are new. These support bound metal compositions may find use as reagents or catalysts.

According to a further aspect of the present invention there is provided a support bound metal composition obtainable by contacting a solution comprising a metal with a scavenger support, whereby the scavenger support binds to at least some of the metal in solution thereby decreasing the amount of metal in solution, characterised in that the scavenger support comprises a functionalised support comprising pendant groups selected from 1,3-ketoesters or 1,3-ketoamides or mixtures thereof attached to a support wherein a number of the pendant groups are reacted with an amine.

Metals, solutions comprising a metal and scavenger supports are as described herein before.

The invention is further illustrated, but not limited, by the following examples.

EXAMPLES

Example 1

Preparation of Enaminoester Containing Supports 1-12 Using Nucleophilic Amines 2.0 g, (4 mmol) of a resin prepared from acetoacetoxyethyl methacrylate (AAEM), styrene and 1 wt % divinylbenzene (as taught in patent application WO0198378) containing 2.0 mmol/g of acetoacetoxy functionality was charged to a large vial. Tetrahydrofuran (THF) (20 ml) was added and the resin left to swell for 1 hour. Amine-containing compound (12 mmol, 3 equivalents) was then added, the vial was stoppered and the mixture left to agitate on a roller for 18 hours. The resin was filtered through a sinter and then washed with THF (5×20 ml), THF/methanol 50/50 (10×20 ml), and methanol (5×20 ml). The resin was dried to a constant weight at room temperature under vacuum. Loading values were calculated from elemental analysis of nitrogen content. The resins produced are detailed in Table 1.

TABLE 1

Resins produced by reaction of 1% DVB Ketoester resin with nucleophilic amines

| Scavenger resin produced | Amine used | | Loading of Amine (from % N), mmol/g |
|---|---|---|---|
| 1 | Butylamine | $H_2N\diagup\diagdown\diagup$ | 1.57 |
| 2 | Benzylamine | $H_2N$—CH$_2$—Ph | 0.93 |
| 3 | Ethylene-diamine | $H_2N\diagup\diagdown NH_2$ | 1.61 |
| 4 | Diethylene-triamine | $H_2N\diagup\diagdown N(H)\diagup\diagdown NH_2$ | 1.36 |

TABLE 1-continued

Resins produced by reaction of 1% DVB Ketoester resin with nucleophilic amines

| Scavenger resin produced | Amine used | | Loading of Amine (from % N), mmol/g |
|---|---|---|---|
| 5 | Triethylne-tetramine | H₂N−CH₂CH₂−NH−CH₂CH₂−NH−CH₂CH₂−NH₂ | 1.2 |
| 6 | Tris-(2-amino-ethyl)amine | N(CH₂CH₂NH₂)₃ | 1.27 |
| 7 | Poly(ethylene-imine 1200 | H₂N−[CH₂CH₂−NH]ₙ−CH₂CH₂−NH₂ | 8 mmol/g of nitrogen |
| 8 | Triethoxy-3-aminopropyl-silane | H₂N−CH₂CH₂CH₂−Si(OEt)₃ | 1.36 |
| 9 | 4-Aminomethyl pyridine | H₂N−CH₂−(4-pyridyl) | 1.64 |
| 10 | 1-(3-amino-propyl)-imidazole | H₂N−CH₂CH₂CH₂−(1-imidazolyl) | 1.55 |
| 11 | Thiophene-2-methylamine | H₂N−CH₂−(2-thienyl) | 0.71 |
| 12 | 3-Aminopropyl-diphenyl-phosphine | H₂N−CH₂CH₂CH₂−P(Ph)₂ | 0.57 |

Example 2

Preparation of Enaminoester Containing Supports 13 and 14 Using Aromatic Amines 2.0 g (4 mmol) of a resin prepared from acetoacetoxyethyl methacrylate, styrene, and 1 mol % divinylbenzene (as taught in patent application WO0198378) containing 2.0 mmol/g of acetoacetoxy functionality was charged to a 100 ml 4 necked round-bottomed flask fitted with a stirrer, temperature probe and condenser. THF (20 mls) was added and the resin allowed to swell for 30 minutes. 2-Aminothiophenol or 4-aminothiphenol (1.502 g, 12 mmol, 3 equivalents) and p-toluenesulphonic acid (50 mg, 0.29 mmol, 0.07 equivalents) were added to the stirred suspension. The reaction mixture was heated to reflux (67° C.) and maintained at this temperature for a further 5 hours. The mixture was cooled to room temperature, the resin filtered on a glass sinter funnel and subsequently washed with THF (5×20 ml), THF/methanol 50/50 (10×20 ml), and methanol (5×20 ml). The resin was dried to a constant weight at 40° C. under vacuum. Loading values were calculated from elemental analysis of nitrogen and sulphur content. The resins produced are detailed in Table 2.

TABLE 2

Resins produced by reaction of 1% DVB Ketoester resin with aromatic amines

| Scavenger resin produced | Amine used | | Loading of Amine (from % S), mmol/g |
|---|---|---|---|
| 13 | 2-aminothiophenol | (HS, H₂N-phenyl structure) | 1.57 |
| 14 | 4-aminothiophenol | (H₂N-phenyl-SH structure) | 1.64 |

Example 3

Preparation of Resin 15 Derived from Reaction of Phenylthiosemicarbazide and Ketoester Resin 2.0 g (4 mmol) of a resin prepared from acetoacetoxyethyl methacrylate, styrene, and 1 mol % divinylbenzene (as taught in patent application WO0198378) containing 2.0 mmol/g of acetoacetoxy functionality was charged to a 100 ml 4 necked round-bottomed flask fitted with a stirrer, temperature probe, and condenser. THF (20 mls) was added and the resin allowed to swell for 30 minutes. 4-Phenyl-3-thiosemicarbazide (2.0 g, 12 mmol, 3 equivalents) was dissolved in a mixture of ethanol and THF (50:50 vol:vol, 20 ml) and the solution added to the swollen resin. p-toluenesulphonic acid (50 mg, 0.29 mmol, 0.07 equivalents) was added to the flask, the reaction mixture was heated to reflux (67° C.) and maintained at this temperature for a further 5 hours. The mixture was cooled to room temperature, the resin filtered on a glass sinter funnel, and subsequently washed with THF (5×20 ml), THF/methanol 50/50 (10×20 ml), and methanol (5×20 ml). The resin was dried to a constant weight at 40° C. under vacuum. Loading values were calculated from elemental analysis of nitrogen and sulphur content. The resin produced is detailed in Table 3.

TABLE 3

Resin produced by reaction of 1% DVB Ketoester resin with phenylthiosemicarbazide

| Scavenger resin produced | Amine used | | Loading of Amine (from % N), mmol/g |
|---|---|---|---|
| 15 | Phenylthio-semi-carbazide | 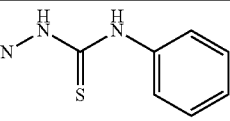 | 1.43 |

Example 4

Chemical Modification of AAEM-DETA Resin 4

4.1 Reaction with Carbon Disulphide to give Resin 16

AAEM-DTA resin 4 (3.0 g, 1.36 mmol/g, 4.08 mmol) was charged to a 100 ml flask fitted with a stirrer, temperature probe, and condenser. Anhydrous dichloromethane (DCM) (30 ml) was added and the suspension cooled to 0° C. Carbon disulphide (0.621 g, 8.16 mmol, 2 equivalents) was charged to the stirred suspension followed by triethylamine (0.826 g, 8 mmol, 2 equivalents). The reaction mixture was left to stir at 0-5° C. for 1 hour and the reaction mixture allowed to warm to room temperature. The reaction was then heated to reflux for 4 hours, cooled, and the resin filtered off. The resin was washed with DCM, (5×20 ml), DCM/methanol 50/50 (10×20 ml) and methanol (5×20 ml) and dried to a constant weight at 40° C. under vacuum. Loading values were calculated from elemental analysis of nitrogen and sulphur content. The resin produced is detailed in Table 4.

4.2 Reaction with Hexylthioisocyanate to give Resin 17

AAEM-DTA resin 4 (2.0 g, 1.36 mmol/g, 2.72 mmol) was charged to a large vial. Anhydrous THF (20 mls) was added and the resin allowed to swell for 30 minutes. Hexylthioiso-cyanate (1.946 g, 13.6 mmol, 5 equivalents) was added, the vial sealed and agitated on a roller for 48 hours at room temperature. The reaction mixture was filtered and the resin washed with THF (5×20 ml) and diethyl ether (5×20 ml), then dried to a constant weight at 40° C. under vacuum. Loading values were calculated from elemental analysis of nitrogen and sulphur content. The resin produced is detailed in Table 4.

TABLE 4

Resins produced by chemical modification of AAEM-DETA resin 4

| Scavenger resin produced | Modification of AAEM resin | | Loading (from % S), mmol/g |
|---|---|---|---|
| 16 | Diethylene triamine modified with carbon disulphide | 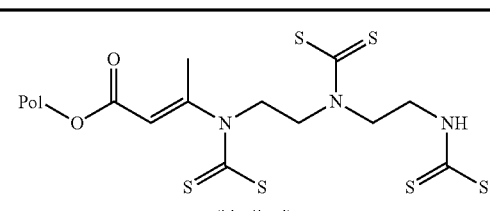 | 1.53 mmol/g dithiocarbamate |

(idealised)

TABLE 4-continued

Resins produced by chemical modification of AAEM-DETA resin 4

| Scavenger resin produced | Modification of AAEM resin | Loading (from % S), mmol/g |
|---|---|---|
| 17 | Diethylene triamine modified with hexylthioisocyanate | 1.47 mmol/g thiourea groups |

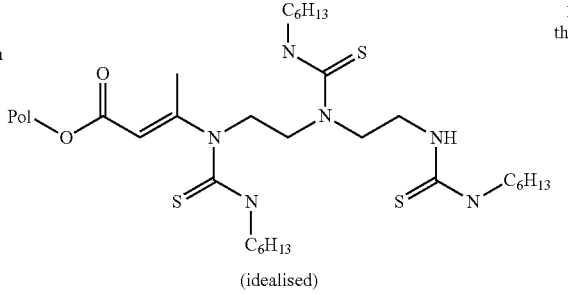

(idealised)

Example 5

Preparation of Enaminoester Containing Supports 18-19 Using a Macroporous AAEM Resin 2.0 g (4.6 mmol) of a macroporous resin containing a total of 2.3 mmol/g of acetoacetoxy functionality (prepared from AAEM and 40 wt % divinylbenzene using as porogen a 30% polystyrene (molecular weight 50000) in toluene solution at 40% on total organic phase, as taught in patent application WO0198378) was charged to a large vial. THF (20 ml) was added and the resin left to swell for 1 hour. Amine-containing compound (12 mmol, 3 equivalents) was then added, the vial was stoppered and the mixture left to agitate on a roller for 18 hours. The resin was filtered through a sinter and then washed with THF (5×20 ml), THF/methanol 50/50 (10×20 ml) and methanol (5×20 ml). The resin was dried to a constant weight at room temperature under vacuum. Loading values were calculated from elemental analysis of nitrogen content. The resins produced are detailed in Table 5.

perature and stirring for a further 18 hours. The resin was filtered off from the solution and washed with DCM (5×50 ml), DCM/methanol (10×50 ml) and methanol (5×50 ml), and dried in a vacuum oven at 40° C. overnight, resulting in 5.49 g of beads with a negative Kaiser test (qualitative colourimetric test for primary amines, involving incubating ca 5 mg of the resin with 4 drops of 5% ninhydrin in ethanol, 2 drops of 80% phenol in ethanol, 2 drops of pyridine (dried)), indicating all the amine functionality had reacted according to the following reaction scheme:

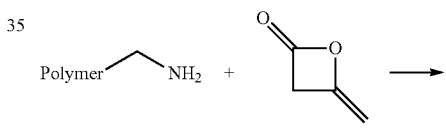

TABLE 5

| Scavenger resin produced | Amine used | | Loading of Amine (from % N), mmol/g |
|---|---|---|---|
| 18 | Macroporous AAEM/ethylene diamine | H$_2$N−−−NH$_2$ | 1.25 |
| 19 | Macroporous AAEM/diethylene triamine | H$_2$N−−−NH−−−NH$_2$ | 1.00 |

Example 6

Preparation of Enaminoamide Containing Support 20 Using a Microporous Amino Functional Resin 50 ml anhydrous DCM was added to 5.0 g of an aminomethylpolystyrene resin (Biotherm BT-3100 100-200 mesh, ca 1.4 mmol/g, 6.8 mmol) under nitrogen, allowed to swell at room temperature for 30 minutes, then cooled with stirring to −5° C. Diketene (2.62 ml, 34 mmol, 5 equivalents) was dissolved in anhydrous 5 ml DCM and then slowly added to the stirred resin whilst maintaining the reaction temperature at −15 to −20° C. The mixture was allowed to stir at this temperature for 2 hours before allowing to warm to room tem- -continued

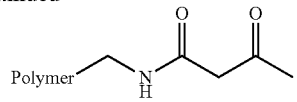

1 g of the ketoamide resin thus produced was swollen with THF (10 ml) for 30 minutes then treated with diethylene triamine (0.421 g, 4.1 mmol, 3 equivalents on theoretical loading) and agitated for 18 hours. The resin was filtered off and washed with THF (5×10 ml), THF/methanol 50/50 (10× 10 ml) and methanol (5×10 ml). The resin was dried to a constant weight at room temperature under vacuum to give support 20.

Example 7

Preparation of a Ketoester Functional Support 21 Prepared from a Microporous Amino Functional Resin and a Multifunctional Ketoester 50 ml anhydrous THF was added to 5.0 g of an aminomethylpolystyrene resin (Biotherm BT-3100 100-200 mesh, ca 1.4 mmol/g, 6.8 mmol) under nitrogen and allowed to swell at room temperature for 30 minutes. Trimethylolpropane triacetoacetate (Lonzamon AATMP, 7.88 g, 20 mmol, 3 equivalents) was added to the mixture and left to react for 18 hours at room temperature. The resin was filtered off from the solution and washed with DCM (5×50 ml), DCM/methanol (10×50 ml), and methanol (5×50 ml), and dried in a vacuum oven at 40° C. overnight, resulting in 5.99 g of beads with a very weak positive Kaiser test, indicating most of the amine functionality had reacted according to the following scheme:

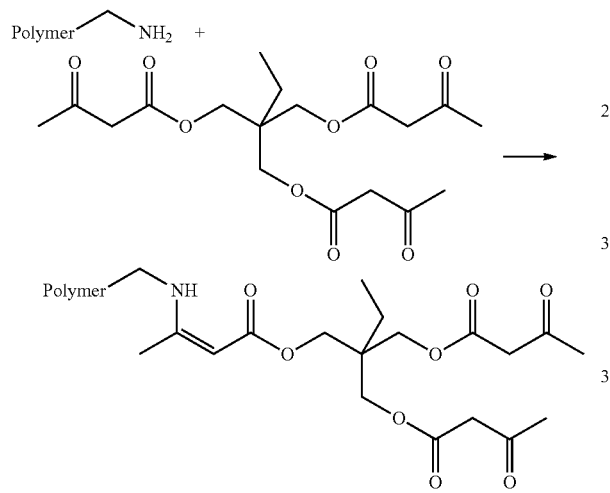

1 g of the resin thus produced was swollen with THF (10 ml) for 30 minutes then treated with diethylene triamine (1.263 g, 12.2 mmol, 4.5 equivalents on theoretical maximum loading of ketoester) and agitated for 18 hours. The resin was filtered off and washed with THF (5×10 ml), THF/methanol 50/50 (10×10 ml), and methanol (5×10 ml). The resin was dried to a constant weight at room temperature under vacuum to give support 21.

Example 8

Preparation of Enaminoamide Containing Support 22 Using an Amino Functional Silica Gel 40 ml anhydrous DCM was added to 5.0 g of an aminopropyl functional silica (surface area 650 m2/g, 7.2% C content) and cooled with overhead stirring to −15° C. Diketene (2.396 g) in DCM (5 ml) was added slowly whilst keeping the temperature between −15 and −20° C., and the mixture stirred at this temperature for 2 hrs before warming to room temperature. After a further 18 hours the silica was filtered off, washed with DCM (10×40 ml) and diethyl ether (5×40 ml), then dried in a vacuum oven at 40° C. to constant weight. This yielded 5.129 g of silica with a negative Kaiser test for primary amines, indicating the amines had reacted according to the following scheme:

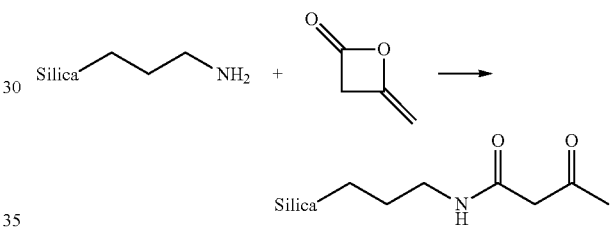

1.0 g of the silica thus produced was treated with diethylene triamine (0.353 g) in THF (10 ml) and agitated at room temperature for 18 hours. The silica was filtered off, washed with THF (5×10 ml), THF/methanol 1:1 (10×5 ml), and methanol (5×10 ml), then dried in a vacuum oven at 40° C. to constant weight, yielding 1.0 g of support 22.

TABLE 6

| Scavenger support produced | Support structure | Loading of Amine (from % N), mmol/g |
|---|---|---|
| 20 | 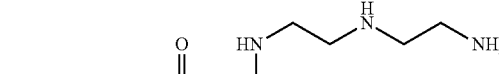 | 0.52 |
| 21 | 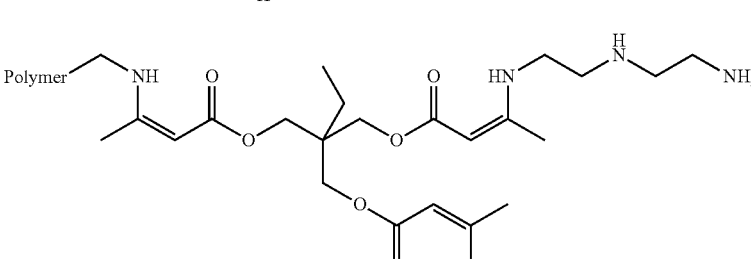 | 0.60 |

TABLE 6-continued

| Scavenger support produced | Support structure | Loading of Amine (from % N), mmol/g |
|---|---|---|
| 22 |  | 0.48 |

Example 9

Scavenging of Palladium from Organic Solutions

Seven solutions were made up containing palladium salts with and without additional compounds. Palladium(II) acetate was dissolved in 3 separate single solvents: dichloromethane, N,N-dimethylformamide and tetrahydrofuran. Palladium(II) acetate was also dissolved in a 9:1 vol/vol mixture of DCM and triethylamine. A solution of palladium(II) chloride was made up in THF. Tris(dibenzylideneacetone) dipalladium(0) (Pd2(dba)3) was dissolved in DCM. Palladium(II) acetate and 4 equivalents of triphenylphosphine were dissolved in DCM.

Typical amounts of reagents used to make up the solutions, targeting 1000 or 500 ppm are shown below:

TABLE 7

| Palladium source | Mass (g) | Additive and amount | Solvent (made up to 100 ml) | Target Pd level (ppm wt/vol) |
|---|---|---|---|---|
| Pd(OAc)2 | 0.218 | — | DCM | 1000 |
| Pd(OAc)2 | 0.218 | — | DMF | 1000 |
| Pd(OAc)2 | 0.218 | — | THF | 1000 |
| Pd(OAc)2 | 0.218 | Triethylamine, 10 ml | DCM | 1000 |
| PdCl2 | 5 ml of a standard 1% Pd w/v solution in THF | — | THF | 500 |
| Pd2(dba)3 | 0.215 | — | DCM | 500 |
| Pd(OAc)2 | 0.218 | Triphenylphosphine, 1.02 g (4 equiv on Pd) | DCM | 1000 |

Some solutions were made up targeting a lower level of palladium than given in this table.

Efficacy tests were carried out by mixing a quantity of the test resin with a 10 ml aliquot of the solution in a sealed vial and agitated on a roller for 16 hours.

For the Comparative Examples using Smopex 110 (isothiouronium functionality), Smopex 111 (thiol functionality) (both obtained from Johnson Matthey Inc.), and Chelex 100 (iminodiacetate functionality, obtained from Fluka), the quantity of resin used was 16 molar equivalents of functionality per molar equivalent of metal.

For the Resins 1-19 and 22, the quantity of resin used was 4 molar equivalents of the enamine on the resin per molar equivalent of metal.

For example 0.240 g of resin 1 (1.57 mmol/g, 377 µmol enamine) was used for 10 mls of a 1000 ppm wt/vol Pd solution of palladium acetate in DCM (94 µmol Pd). The resin was filtered off and the solution subjected to palladium analysis.

In addition, AAEM, a ketoester resin, which is the functional support used in the preparation of scavenger supports of Examples 1-4, and MP-AAEM, a ketoester resin, which is the functional support used in the preparation of scavenger supports of Example 5, were also tested and represent Control Examples of non-amine functionalised supports.

The solutions (including the starting solutions) were tested for palladium by ICP-AES (Inductively Coupled Plasma-Atomic Emission Spectroscopy). The solvent was first removed by evaporation and the residues were digested in nitric/sulphuric acid mixture. The results are expressed as parts per million wt/wt of palladium in solution, and as the percent reduction of palladium in solution after scavenging. The results are shown in Tables 9.1-9.7.

In Table 9.1, the resins prepared in Examples 1-19 and 22, scavenger supports of the present invention, are shown to be more effective at removing palladium from solution than the Control (non-amine functionalised resins) and the Comparative Examples.

In Table 9.2-9.6, several scavenger supports of the present invention are shown to be effective in removing palladium from solutions containing species, such as DMF, triethylamine and triphenylphosphine which are all known to coordinate to palladium in solution. (Note: triethylamine and particularly triphenylphosphine are known to be particularly strong coordinators).

TABLE 9.1

| | Pd(OAc)2 in DCM (yellow-brown solution) | | |
|---|---|---|---|
| Support | Pd level Before (ppm) | Pd level After (ppm) | % reduction |
| Smopex 110 | 790 | 670 | 15.2 |
| Smopex 111 | 790 | 135 | 82.9 |
| Chelex 100 | 405 | 390 | 3.7 |
| AAEM | 790 | 815 | 0.00 |
| MP-AAEM | 790 | 760 | 3.80 |
| 1 | 785 | 9 | 98.85 |
| 2 | 410 | 1 | 99.76 |
| 3 | 755 | 3 | 99.60 |
| 4 | 755 | <1 | >99.87 |
| 5 | 755 | 1 | 99.87 |
| 6 | 745 | 1 | 99.87 |
| 7 | 755 | 1 | 99.87 |
| 8 | 775 | 10 | 98.71 |
| 9 | 405 | <1 | >99.75 |
| 10 | 755 | <1 | >99.87 |
| 11 | 785 | <1 | >99.87 |
| 12 | 785 | Colourless* | |
| 13 | 405 | <1 | >99.75 |
| 14 | 410 | <1 | >99.76 |
| 15 | 410 | <1 | >99.76 |
| 16 | 755 | 11 | 98.54 |
| 17 | 755 | 1 | 99.87 |
| 18 | 775 | 3 | 99.61 |
| 19 | 775 | 68 | 91.23 |
| 22 | 395 | <1 | >99.75 |

TABLE 9.1-continued

Pd(OAc)2 in DCM (yellow-brown solution)

| Support | Pd level Before (ppm) | Pd level After (ppm) | % reduction |
|---|---|---|---|

Smopex 110, Smopex 111 and Chelex 100 are Comparative Examples.

AAEM is the ketoester resin used for reaction with amines in Examples 1-4 and MP-AAEM is the resin used for reaction with amines in Example 5. These are Control Experiments and are Examples of non-amine functionalised resins.

No quantitative data was obtained for resin 12, colouration indicates high level of scavenging.

TABLE 9.2

Pd(OAc)2 in DMF

| Support | Pd level Before (ppm) | Pd level After (ppm) | % reduction |
|---|---|---|---|
| 1 | 530 | 22 | 95.85 |
| 3 | 1065 | 31 | 97.09 |
| 4 | 530 | 120 | 77.36 |
| 5 | 530 | 210 | 60.38 |
| 11 | 530 | <1 | >99.81 |
| 13 | 530 | 1 | 99.81 |
| 15 | 530 | 3 | 99.43 |
| 17 | 530 | 61 | 88.49 |

TABLE 9.3

Pd(OAc)2 in THF

| Support | Pd level Before (ppm) | Pd level After (ppm) | % reduction |
|---|---|---|---|
| 3 | 545 | 10 | 98.17 |
| 4 | 1115 | 290 | 73.99 |
| 5 | 545 | 145 | 73.39 |
| 9 | 545 | 13 | 97.61 |
| 11 | 1115 | 1 | 99.91 |
| 13 | 1115 | <1 | >99.91 |
| 16 | 1115 | 155 | 86.10 |
| 17 | 1115 | <1 | >99.91 |

TABLE 9.4

Pd(OAc)$_2$ in 9:1 DCM:Et3N

| Support | Pd level Before (ppm) | Pd level After (ppm) | % reduction |
|---|---|---|---|
| 3 | 780 | 18 | 97.69 |
| 4 | 780 | 8 | 98.97 |
| 5 | 780 | 9 | 98.85 |
| 7 | 780 | 170 | 78.21 |
| 11 | 415 | 20 | 95.18 |
| 13 | 415 | 17 | 95.90 |
| 17 | 415 | 12 | 97.11 |

TABLE 9.5

PdCl$_2$ in THF

| Support | Pd level Before (ppm) | Pd level After (ppm) | % reduction |
|---|---|---|---|
| 3 | 655 | 25 | 96.18 |
| 4 | 655 | 33 | 94.96 |
| 5 | 655 | 10 | 98.47 |
| 6 | 655 | 37 | 94.35 |
| 7 | 655 | <1 | >99.85 |
| 9 | 655 | 205 | 68.70 |

TABLE 9.6

Pd$_2$(dba)$_3$ in DCM (deep purple solution)

| Support | Pd level Before (ppm) | Pd level After (ppm) | % reduction |
|---|---|---|---|
| 4 | 195 | <1 | >99.49 |
| 5 | 165 | <1 | >99.39 |
| 6 | 165 | <1 | >99.39 |
| 11 | 195 | <1 | >99.49 |
| 13 | 195 | <1 | >99.49 |
| 15 | 165 | <1 | >99.39 |
| 17 | 195 | <1 | >99.49 |
| 20 | | Pale yellow* | |
| 21 | | Pale yellow* | |
| 22 | 340 | <1 | >99.7 |

TABLE 9.7

Pd(OAc)$_2$/PPh$_3$ in DCM (Dark brown solution)

| Support | Pd level Before (ppm) | Pd level After (ppm) | % reduction |
|---|---|---|---|
| 4 | 360 | 12 | 96.67 |
| 5 | 290 | 6 | 97.93 |
| 6 | 290 | 62 | 78.62 |
| 11 | 360 | 115 | 68.06 |
| 13 | 360 | 2 | 99.44 |
| 15 | 290 | 61 | 78.97 |
| 17 | 360 | 41 | 88.61 |
| 20 | | Colourless* | |
| 21 | | Colourless* | |
| 22 | 400 | <1 | >99.75 |

*No quantitative data obtained - colouration indicates high level of scavenging

Example 10

Scavenging of Metal from Organic Solutions of Other Metal Complexes

In order to demonstrate the efficacy of supports of the invention as scavengers for metals other than palladium a variety of other transition metal solutions (cobalt, nickel, vanadium, rhodium and copper) were made up as follows:

| Metal salt | Mass (g) | Solvent (made up to 100 ml) | Target Metal level (ppm wt/vol) |
|---|---|---|---|
| CoCl$_2$(PPh$_3$)$_2$ | 0.555 | DCM | 500 |
| Ni(Acac)$_2$ | 0.218 | DCM | 500 |

-continued

| Metal salt | Mass (g) | Solvent (made up to 100 ml) | Target Metal level (ppm wt/vol) |
|---|---|---|---|
| NiCl$_2$(PPh$_3$)$_2$ | 0.557 | DMF | 500 |
| OV(Acac)$_2$ | 0.26 | DCM | 500 |
| [Rh(OAc)$_2$]$_2$ | 0.108 | DMF | 500 |
| Cu(Acac)$_2$ | 0.206 | DCM | 500 |

Efficacy tests were carried out by mixing a quantity of the test resin with a 10 ml aliquot of the solution in a sealed vial and agitated on a roller for 16 hours. The quantity of resin used was 4 molar equivalents of the enamine on the resin per molar equivalent of metal. The resultant solutions were subjected to ICP-OES analysis in a similar manner to Example 8, by evaporation of solvent and digestion of the residue.

For example 0.21 g of resin 9 (1.64 mmol/g, 344 μmol enamine) was used for 10 mls of a 500 ppm wt/vol Co solution of bis(triphenylphosphino)cobalt(II) chloride in DCM (85 μmol Co). The resin was filtered off and the solution subjected to ICP analysis for cobalt.

The results are shown in Table 10. They demonstrate that the resins of the current invention demonstrate a high affinity for a wide variety of transition metals in a variety of complexes.

TABLE 10

| Support | Metal Solution | Metal level Before (ppm) | Metal level After (ppm) | % reduction |
|---|---|---|---|---|
| 9 | CoCl2(PPh3)2 in DCM | 115 | <1 | >99.1 |
| 11 | CoCl2(PPh3)2 in DCM | 115 | <1 | >99.1 |
| 11 | Ni(Acac)2 in DCM | 370 | <1 | >99.7 |
| 13 | Ni(Acac)2 in DCM | 370 | 59 | 84.0 |
| 11 | NiCl2(PPh3)2 in DMF | 520 | 4 | 99.2 |
| 11 | OV(Acac)2 | 340 | 19 | 94.4 |
| 3 | [Rh(OAc)2]2 | 545 | 66 | 87.9 |
| 9 | [Rh(OAc)2]2 | 545 | <5 | >99.1 |
| 11 | [Rh(OAc)2]2 | 545 | <5 | >99.1 |
| 13 | Cu(Acac)2 | 390 | <1 | >99.7 |

What is claimed:

1. A process for removing metal from solution wherein a solution comprising a metal is contacted with a scavenger support, whereby the scavenger support binds to at least some of the metal in solution thereby decreasing the amount of metal in solution, characterised in that the scavenger support comprises a functionalised support comprising pendant groups selected from 1,3-ketoesters or 1,3-ketoamides or mixtures thereof attached to a support wherein a number of the pendant groups are reacted with an amine.

2. A process according to claim 1 wherein the functionalised support comprises pendant 1,3-ketoester or 1,3-ketoamide groups of formula 1:

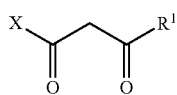

(1)

wherein R$^1$ is an optionally substituted hydrocarbyl, perhalogenated hydrocarbyl or heterocyclyl group;

X is O or NR$^2$, wherein the free valence of O or NR$^2$ is bonded to a support optionally via a linker; and R$^2$ is hydrogen, an optionally substituted hydrocarbyl, or heterocyclyl group.

3. A process according to claim 2 wherein the support is an inorganic or organic support, preferably an organic support.

4. A process according to claim 3 wherein when the support is an inorganic support, the functionalised support comprising pendant groups selected from 1,3-ketoesters or 1,3-ketoamides or mixtures thereof attached to a support is obtained by reacting an amino functionalised silica with a functionalising agent selected from ethylene glycol diacetoacetate, ethylene bisacetoacetamide, 1,1,1-tris(acetoacetoxymethyl)propane, diacetoacet-o-tolidide, diacetoacet-1,4-phenylenediamide, diacetoacet-2,5-dimethyl-1,4-phenylenediamide, diacetoacet-2-chloro-5-methyl-1,4-phenylenediamide, diacetoacet-2,5-dichloro-1,4-phenylenediamide, diketene, or 2,2,6-trimethyl-4H-1,3-dioxin-4-one.

5. A process according to claim 3 wherein when the support is an organic support, the functionalised support comprising pendant groups selected from 1,3-ketoesters or 1,3-ketoamides or mixtures thereof attached to a support is obtained by reacting an amino functionalised polymer, such as an amino polystyrene, with a functionalising agent selected from ethylene glycol diacetoacetate, ethylene bisacetoacetamide, 1,1,1-tris(acetoacetoxymethyl)propane, diacetoacet-o-tolidide, diacetoacet-1,4-phenylenediamide, diacetoacet-2,5-dimethyl-1,4-phenylenediamide, diacetoacet-2-chloro-5-methyl-1,4-phenylenediamide, diacetoacet-2,5-dichloro-1,4-phenylenediamide, diketene, or 2,2,6-trimethyl-4H-1,3-dioxin-4-one.

6. A process according to claim 3 wherein when the support is an organic support, the functionalised support comprising pendant groups selected from 1,3-ketoesters or 1,3-ketoamides or mixtures thereof attached to a support is obtained by polymerisation of a composition comprising a functionalised monomer comprising pendant 1,3-ketoester or 1,3-ketoamide groups attached by means of a linker to a single monomer type.

7. A process according to claim 6 wherein the functionalised support comprising pendant groups selected from 1,3-ketoesters or 1,3-ketoamides or mixtures thereof attached to a support is obtained by polymerisation of a composition comprising a functionalised monomer comprising pendant 1,3-ketoester or 1,3-ketoamide groups attached by means of a linker to a single monomer type, and one or more monomers selected from the group consisting of styrene and substituted styrenes, such as α-methyl styrene, methyl styrene, t-butyl styrene, bromo styrene and acetoxy styrene; alkyl esters of mono-olefinically unsaturated dicarboxylic acids, such as di-n-butyl maleate and di-n-butyl fumarate; vinyl esters of carboxylic acids such as vinyl acetate, vinyl propionate, vinyl laurate and vinyl esters of versatic acid; acrylamides such as methyl acrylamide and ethyl acrylamide; methacrylamides such as methyl methacrylamide and ethyl methacrylamide; nitrile monomers such as acrylonitrile and methacrylonitrile; esters of acrylic and methacrylic acid, preferably optionally substituted C$_{1-20}$alkyl and C$_{1-20}$cycloalkyl esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate; divinylbenzene; trivinylbenzene; and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

8. A process according to claim 7 wherein the functionalised monomer comprising pendant 1,3-ketoester or 1,3-ketoamide groups has the general formula 2:

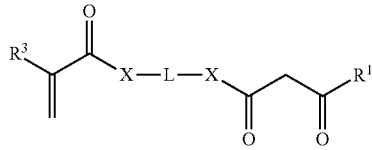

(2)

wherein
each X is independently O or $NR^2$;
$R^1$ and $R^2$ are as defined herein before above;
$R^3$ is H or an optionally substituted hydrocarbyl, perhalogenated hydrocarbyl or heterocyclyl group; and
L is a linking group.

9. A process according to claim 8 wherein the functionalised monomer comprising pendant 1,3-ketoester or 1,3-ketoamide groups has the general formula 2a:

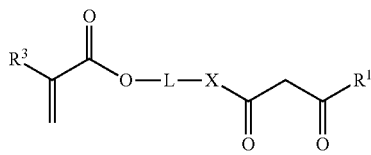

(2a)

wherein
X is O or $NR^2$;
$R^1$ and $R^2$ are as defined herein before above;
$R^3$ is H or an optionally substituted hydrocarbyl, perhalogenated hydrocarbyl or heterocyclyl group; and
L is a linking group.

10. A process according to claim 9 wherein the functional support is obtained by polymerisation of a composition comprising one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene, ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

11. A process according to claim 10 wherein the functional support is obtained by polymerisation of compositions comprising acetoacetoxyethyl methacrylate, styrene and divinylbenzene.

12. A process according to claim 1 wherein the amine is an optionally substituted primary amine, an optionally substituted secondary amine, an optionally substituted hydrazine or salt thereof.

13. A process according to claim 12 wherein the amine is selected from

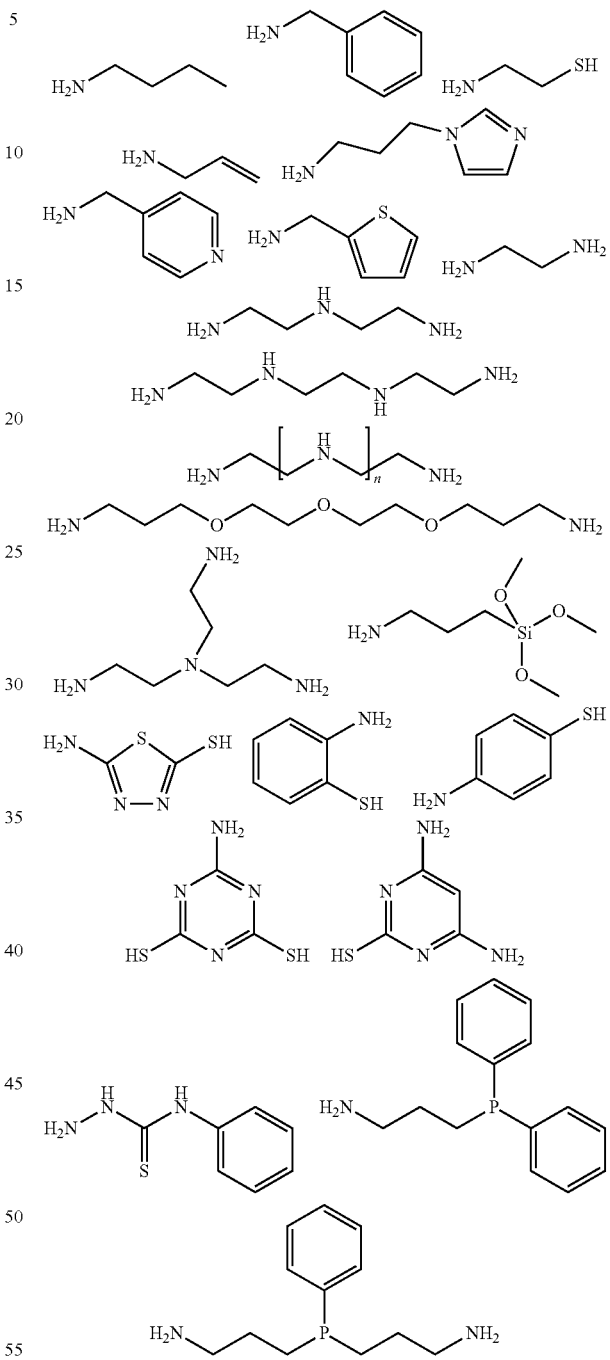

14. A process according to claim 13 wherein the amine is selected from

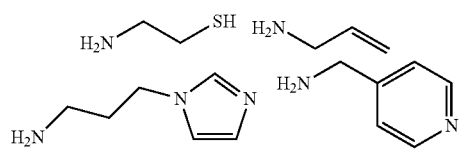

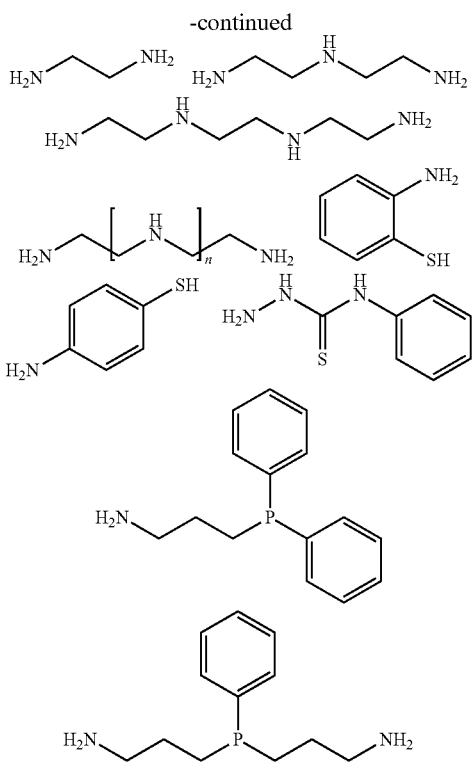

15. A process according to claim 1 wherein the scavenger support is a scavenger support comprising pendant groups selected from 3-iminoesters, 3-iminoamides, 2,3-enaminoesters or 2,3-enaminoamides or mixtures thereof attached to a polymer support.

16. A process according to claim 15 wherein the scavenger support comprises pendant groups selected from 3-iminoesters, 3-iminoamides, 2,3-enaminoesters or 2,3-enaminoamides of formula (3) or (4)

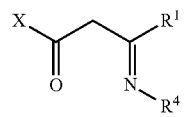

(3)

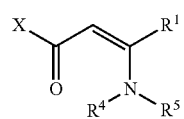

(4)

wherein $R^1$ is an optionally substituted hydrocarbyl, perhalogenated hydrocarbyl or heterocyclyl group;
X is O or $NR^2$, wherein the free valence of O or $NR^2$ is bonded to a support optionally via a linker;
$R^2$ is hydrogen, an optionally substituted hydrocarbyl, or heterocyclyl group;
$R^4$ is a substituent group; and
$R^5$ is hydrogen or a substituent group, or $R^4$ and $R^5$ may optionally be linked in such as way so as to form an optionally substituted heterocyclic ring,
or tautomers thereof.

17. A process according to claim 1 wherein the amine is an amine containing more than one amine group, preferably tri-amine, and more preferably diethylene tri-amine.

18. A process according to claim 17 wherein the scavenger support is reacted with carbon disulphide, an isothiocyanate, or a haloacetate prior to contact with the solution comprising a metal.

19. A process according to claim 1 wherein the metal is a transition metal, preferably a platinum group metal (Group 8, 9 or 10), and more preferably palladium.

* * * * *